US011065832B2

(12) United States Patent
Takagi et al.

(10) Patent No.: US 11,065,832 B2
(45) Date of Patent: Jul. 20, 2021

(54) BLADDER BAG AND MOLDING METHOD OF COMPOSITE MATERIAL

(71) Applicant: MITSUBISHI HEAVY INDUSTRIES, LTD., Tokyo (JP)

(72) Inventors: Kiyoka Takagi, Tokyo (JP); Jun Ishida, Tokyo (JP); Sota Kamo, Tokyo (JP); Katsuya Yoshino, Tokyo (JP); Toshio Abe, Tokyo (JP); Koichi Hasegawa, Tokyo (JP); Yoshihiro Sugiyama, Aichi (JP); Takashi Ishida, Aichi (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 254 days.

(21) Appl. No.: 16/323,651

(22) PCT Filed: Oct. 13, 2017

(86) PCT No.: PCT/JP2017/037215
§ 371 (c)(1),
(2) Date: Feb. 6, 2019

(87) PCT Pub. No.: WO2018/096833
PCT Pub. Date: May 31, 2018

(65) Prior Publication Data
US 2020/0189214 A1 Jun. 18, 2020

(30) Foreign Application Priority Data
Nov. 22, 2016 (JP) .............................. JP2016-226999

(51) Int. Cl.
B29C 70/54 (2006.01)
B29C 70/44 (2006.01)

(52) U.S. Cl.
CPC ............ B29C 70/54 (2013.01); B29C 70/446 (2013.01); B29K 2995/0008 (2013.01)

(58) Field of Classification Search
CPC ......... B29C 33/50; B29C 43/12; B29C 43/32; B29C 70/342; B29C 70/446; B29C 70/54;
(Continued)

(56) References Cited

U.S. PATENT DOCUMENTS 8,911,656 B2   12/2014  Doddman et al.
2009/0041972 A1  2/2009  Rodman
(Continued)

FOREIGN PATENT DOCUMENTS

CN   101484301   7/2009
CN   102083616   6/2011
(Continued)

OTHER PUBLICATIONS

Extended European Search Report dated Jul. 11, 2019 in European Patent Application No. 17873457.0.
(Continued)

Primary Examiner — Robert J Grun
(74) Attorney, Agent, or Firm — Wenderoth, Lind & Ponack, L.L.P.

(57) ABSTRACT

A bladder bag is a mold for molding inside of a composite material structure. The composite material structure includes a narrow portion formed by narrowing a part of the inside and a space portion formed so as to be adjacent to the narrow portion. The bladder bag includes a bladder bag main body and a cord-like member. The bladder bag main body includes a narrow molding portion for molding the narrow portion of the composite material structure, a space molding portion for molding the space portion of the composite material structure, and an air intake for introducing air. The cord-like member is provided inside the bladder bag main (Continued)

body, passes through the narrow molding portion from the air intake, and is connected to an inner surface of the space molding portion.

28 Claims, 18 Drawing Sheets

(58) Field of Classification Search
CPC .................. B29C 70/541; B29C 70/44; B29K 2995/0008
See application file for complete search history.

(56) References Cited

U.S. PATENT DOCUMENTS

| | | |
|---|---|---|
| 2010/0044912 A1 | 2/2010 | Zahlen et al. |
| 2013/0154154 A1 | 6/2013 | Rodman |
| 2014/0322382 A1 | 10/2014 | Morris et al. |
| 2015/0298402 A1 | 10/2015 | Li et al. |
| 2016/0059499 A1 | 3/2016 | Charbonneau et al. |

FOREIGN PATENT DOCUMENTS

| | | |
|---|---|---|
| CN | 102729488 | 10/2012 |
| DE | 10 2014 208 412 | 11/2015 |
| EP | 2 368 685 | 9/2011 |
| JP | 58-56824 | 4/1983 |
| JP | 2010-131838 | 6/2010 |
| JP | 2016-036919 | 3/2016 |
| WO | 2016/144971 | 9/2016 |

OTHER PUBLICATIONS

International Search Report dated Jan. 16, 2018 in International (PCT) Application No. PCT/JP2017/037215.
Office Action dated Jul. 22, 2020 in corresponding Chinese Patent Application No. 201780049569.9, with English Translation.

BLADDER BAG AND MOLDING METHOD OF COMPOSITE MATERIAL

FIELD

The present invention relates to a bladder bag as a mold for molding the inside of a composite material structure and a molding method of the composite material structure.

BACKGROUND

A composite material formed by impregnating reinforcing fibers with resin has been known as a material having a lightweight property and high strength. The composite material is used for airplanes, automobiles, vessels, and the like. When molding the composite material, pressure is applied to the composite material. As a molding method of the composite material, a method using a pressure bag called a bladder bag has been known in order to prevent an inner space of the composite material from being crushed with pressure from the outside when the space is present inside the composite material (see Patent Literature 1 and Patent Literature 2).

CITATION LIST

Patent Literature

Patent Literature 1: Japanese Patent Application Laid-open No. 58-056824
Patent Literature 2: Japanese Patent Application Laid-open No. 2010-131838

SUMMARY

Technical Problem

FIG. 18 is a schematic view of a composite material structure 200. FIG. 19 is a schematic cross-sectional view of a conventional composite material structure 210. FIG. 20 is a schematic cross-sectional view illustrating a conventional mold 220 and an example of one state in a molding method of the conventional composite material structure 210. FIG. 21 is a schematic cross-sectional view illustrating a conventional bladder bag 230 and another example of one state in the molding method of the conventional composite material structure 210. FIGS. 19, 20, and 21 are cross-sectional views of the conventional composite material structure 210 as an example of the composite material structure 200 when cut along line C-C in FIG. 18.

As illustrated in FIGS. 19, 20, and 21, the conventional composite material structure 210 has a first narrow portion 212a, a second narrow portion 212b, and a third narrow portion 212c formed by narrowing inward a part of the inside of the composite material structure 210, and a first space portion 214a, a second space portion 214b, and a third space portion 214c formed so as to be adjacent to the narrow portions. To be specific, the first narrow portion 212a, the second narrow portion 212b, and the third narrow portion 212c are formed in this order from the deep side toward the entrance inside the composite material structure 210. The first space portion 214a, the second space portion 214b, and the third space portion 214c are formed in this order from the deep side toward the entrance inside the composite material structure 210. The first space portion 214a is formed on the deep side of the first narrow portion 212a, the second space portion 214b is formed between the first narrow portion 212a and the second narrow portion 212b, and the third space portion 214c is formed between the second narrow portion 212b and the third narrow portion 212c. As illustrated in FIG. 19, when the composite material structure 210 is molded, pressure is applied thereto from the outside of the composite material structure 210. The inside of the composite material structure 210 therefore needs to be molded by applying pressure from the inside of the composite material structure 210 in order to prevent a space inside the composite material structure 210 from being crushed.

The conventional mold 220 is formed by combining divided molds made of metal or the like and is filled inside the composite material structure 210 to thereby mold the composite material structure 210 while preventing the space inside the composite material structure 210 from being crushed. As illustrated in FIG. 20, the conventional mold 220 has nine mold part bodies of a mold part body 222a, a mold part body 222b, a mold part body 222c, a mold part body 222d, a mold part body 222e, a mold part body 222f, a mold part body 222g, a mold part body 222h, and a mold part body 222i. The mold part body 222a, the mold part body 222b, and the mold part body 222c mold the first space portion 214a. The mold part body 222b molds the first narrow portion 212a. The mold part body 222d, the mold part body 222e, and the mold part body 222f mold the second space portion 214b. The mold part body 222e molds the second narrow portion 212b. The mold part body 222g, the mold part body 222h, and the mold part body 222i mold the third space portion 214c. The mold part body 222h molds the third narrow portion 212c.

The conventional bladder bag 230 molds the inside of the composite material structure 210 by applying pressure thereto from the inside of the composite material structure 210. As illustrated in FIG. 21, the conventional bladder bag 230 has a bladder bag main body 232. The bladder bag main body 232 has a first narrow molding portion 236a, a second narrow molding portion 236b, and a third narrow molding portion 236c for molding the first narrow portion 212a, the second narrow portion 212b, and the third narrow portion 212c, respectively; a first space molding portion 237a, a second space molding portion 237b, and a third space molding portion 237c for molding the first space portion 214a, the second space portion 214b, and the third space portion 214c, respectively; and an air intake 238 for introducing the air into the bladder bag main body 232.

As illustrated in FIG. 20, when the conventional mold 220 is used to mold the composite material structure 210, the mold part bodies arranged on the side of the entrance of the space of the composite material structure 210 can be easily taken out after molding of the composite material structure 210 because the conventional mold 220 is separated into the nine mold part bodies. Depending on the sizes of the narrow portions, it is, however, difficult to take out the mold part body 222a and the mold part body 222c arranged on the deep side in the space even using the mold 220 capable of being separated into the mold part bodies. With the conventional mold 220, the pressure that is applied to the inside of the composite material structure 210 is insufficient and it is difficult to uniformly apply pressure to the inside of the composite material structure 210 because the conventional mold 220 is formed by combining the mold part bodies. The mold part bodies need to be assembled with no gap therebetween and there is also a problem that manufacturing cost of the mold 220 is increased.

As illustrated in FIG. 21, when the conventional bladder bag 230 is used to mold the composite material structure 210, pressure can be uniformly applied to the inside of the composite material structure 210. The space molding portions are, however, caught by the adjacent narrow molding portions when the conventional bladder bag 230 is taken out after molding of the composite material structure 210. It is therefore difficult to take out the conventional bladder bag 230.

As described above, in both of the case in which the conventional mold 220 illustrated in FIG. 20 is used and the case in which the bladder bag 230 illustrated in FIG. 21 is used, there is the problem that it is difficult to completely take out the conventional mold 220 and the conventional bladder bag 230 after molding of the composite material structure 210.

The present invention has been made in view of the above-mentioned circumstances and an object thereof is to provide a bladder bag as a mold for molding the inside of a composite material that can be taken out easily without impairing uniformity of pressure applied to the inside of the composite material, and a molding method of the composite material that enables the bladder bag to be taken out easily.

Solution to Problem

To solve the above-described problem and achieve the object, a bladder bag is a mold for molding inside of a composite material structure. The composite material structure includes a narrow portion formed by narrowing a part of the inside and a space portion formed so as to be adjacent to the narrow portion. The bladder bag includes a bladder bag main body and a cord-like member. The bladder bag main body includes a narrow molding portion for molding the narrow portion of the composite material structure, a space molding portion for molding the space portion of the composite material structure, and an air intake for introducing air. The cord-like member is provided inside the bladder bag main body, passes through the narrow molding portion from the air intake, and is connected to an inner surface of the space molding portion.

With this configuration, uniformity of pressure applied to the inside of the composite material structure is not impaired. The bladder bag can be easily taken out from the inside of the composite material structure by pulling the cord-like member.

Preferably, the bladder bag main body includes a corner portion in the space molding portion, a plurality of the cord-like members are provided, and at least one of the cord-like members is connected to the corner portion of the space molding portion. With this configuration, the bladder bag main body can be separated from the inside of the composite material structure using, as a point of origin, the corner portion of the bladder bag main body that tends to be caught by a recess of the composite material structure when the bladder bag is taken out, so that the bladder bag can be taken out from the inside of the composite material structure more easily.

Preferably, the bladder bag main body includes a reinforcing member that reinforces the space molding portion, a plurality of the cord-like members are provided, and at least one of the cord-like members is connected to the reinforcing member of the space molding portion. With this configuration, when the cord-like members are pulled for taking out the bladder bag, a portion of the bladder bag main body to which the cord-like member is connected can be preferably protected from tensile force with the cord-like member.

To solve the above-described problem and achieve the object, a bladder bag is a mold for molding inside of a composite material structure. The composite material structure includes a narrow portion formed by narrowing a part of the inside and a space portion formed so as to be adjacent to the narrow portion. The bladder bag includes a bladder bag main body and a deaerating circuit. The bladder bag main body includes a narrow molding portion for molding the narrow portion of the composite material structure, a space molding portion for molding the space portion of the composite material structure, and an air intake for introducing air. The deaerating circuit is provided along at least a part of an outer surface of the bladder bag main body. The deaerating circuit is arranged between the bladder bag main body and the composite material structure when the composite material structure is formed, configured to make the bladder bag main body and the composite material structure close to each other by discharging the air in the deaerating circuit, and configured to separate the bladder bag main body and the composite material structure from each other by introducing the air into the deaerating circuit.

With this configuration, uniformity of pressure applied to the inside of the composite material structure is not impaired because the bladder bag main body and the inside of the composite material structure are made close to each other by discharging the air in the deaerating circuit. The bladder bag can be easily taken out from the inside of the composite material structure by introducing the air into the deaerating circuit.

Preferably, the bladder bag further includes a string connecting the bladder bag main body and the deaerating circuit. With this configuration, when the air is introduced into the deaerating circuit, tensile force is generated in the string and the deaerating circuit can be separated from the inside of the composite material structure, so that the bladder bag can be taken out from the inside of the composite material structure more easily.

Preferably, in the configuration including the deaerating circuit and the string, the bladder bag main body includes a corner portion in the space molding portion, and the string is connected to the corner portion of the space molding portion. With this configuration, the deaerating circuit can be separated from the inside of the composite material structure using, as a point of origin, the corner portion of the bladder bag main body that tends to be caught by the recess of the composite material structure when the bladder bag is taken out, so that the bladder bag can be taken out from the inside of the composite material structure more easily.

Preferably, the bladder bag further includes a first magnet that is provided in the space molding portion of the bladder bag main body. The first magnet makes the bladder bag main body and the composite material structure close to each other by bringing a second magnet having a magnetic pole differing from a magnetic pole of the first magnet close to the magnet from outside of the composite material structure, and separates the bladder bag main body and the composite material structure from each other by bringing a third magnet having the same magnetic pole as the magnetic pole of the first magnet close to the first magnet from the outside of the composite material structure. With this configuration, uniformity of pressure applied to the inside of the composite material structure is not impaired because the bladder bag main body and the inside of the composite material structure are made close to each other with attraction force of the first and second magnets. Furthermore, the bladder bag can be taken out from the inside of the composite material structure more easily with repulsive force of the first and third magnets.

Preferably, the bladder bag further includes a solid member that is provided on a side of an outer surface of the space molding portion of the bladder bag main body. With this configuration, the bladder bag main body can be preferably protected from the inner surface of the composite material structure.

Preferably, the bladder bag further includes a sensor that is provided on a side of the inner surface of the space molding portion of the bladder bag main body and measures a physical amount of the inside of the composite material structure. With this configuration, molding conditions of the composite material structure in the bladder bag can be measured. In this configuration, the bladder bag may further include a wiring connected to the sensor from the air intake, and the sensor may be capable of wireless information communication.

Preferably, the narrow molding portion is capable of being connected to and separated from the bladder bag main body. With this configuration, the bladder bag can be arranged inside the composite material structure easily and can be taken out from the inside of the composite material structure more easily.

Preferably, the space molding portion separated by the narrow molding portion is to be integrated with the composite material structure. With this configuration, a part of the bladder bag main body can be integrated with the composite material structure to be preferably reused for, for example, fuel tanks of airplanes, automobiles, vessels, and the like.

To solve the above-described problem and achieve the object, a molding method of a composite material structure is a method for molding a composite material structure including a narrow portion formed by narrowing a part of inside and a space portion formed so as to be adjacent to the narrow portion. The method includes arranging, at the inside of the composite material structure, a bladder bag as a mold including: a bladder bag main body that has a narrow molding portion for molding the narrow portion of the composite material structure, a space molding portion for molding the space portion of the composite material structure, and an air intake for introducing air; and a cord-like member that is provided inside the bladder bag main body, passes through the narrow molding portion from the air intake, and is connected to an inner surface of the space molding portion; molding the composite material structure while applying pressure to the inside of the composite material structure by introducing the air from the air intake of the bladder bag main body of the bladder bag arranged at the arranging; and taking out the bladder bag from the inside of the composite material structure by pulling the cord-like member from a direction of the air intake after the molding.

With this configuration, uniformity of pressure applied to the inside of the composite material structure is not impaired. The bladder bag can be easily taken out from the inside of the composite material structure by pulling the cord-like member.

Preferably, at the taking, the cord-like member is pulled from the direction of the air intake after the composite material structure and the bladder bag main body are separated from each other by hooking the cord-like member on a hooking rod and pulling the cord-like member in a direction of separating the cord-like member from the composite material structure. With this configuration, the bladder bag can be taken out from the inside of the composite material structure more easily by pulling the cord-like member.

To solve the above-described problem and achieve the object, a molding method of a composite material structure is a method for molding a composite material structure including a narrow portion formed by narrowing a part of inside and a space portion formed so as to be adjacent to the narrow portion. The method includes arranging, at the inside of the composite material structure, a bladder bag as a mold including: a bladder bag main body that has a narrow molding portion for molding the narrow portion of the composite material structure, a space molding portion for molding the space portion of the composite material structure, and an air intake for introducing air; and a deaerating circuit that is provided along at least a part of an outer surface of the bladder bag main body. The method further includes a molding the composite material structure while applying pressure to the inside of the composite material structure by introducing the air from the air intake of the bladder bag main body of the bladder bag arranged at the arranging and making the bladder bag main body and the composite material structure close to each other by discharging the air in the deaerating circuit arranged between the bladder bag main body and the composite material structure; and taking out the bladder bag from the inside of the composite material structure while separating the bladder bag main body and the composite material structure from each other by introducing the air into the deaerating circuit after the molding.

With this configuration, uniformity of pressure applied to the inside of the composite material structure is not impaired because the bladder bag main body and the inside of the composite material structure are made close to each other by discharging the air in the deaerating circuit. The bladder bag can be easily taken out from the inside of the composite material structure by introducing the air into the deaerating circuit.

Preferably, the bladder bag further includes a first magnet that is provided in the space molding portion of the bladder bag main body; at the arranging, the bladder bag main body and the composite material structure are made close to each other by bringing a second magnet having a magnetic pole differing from a magnetic pole of the first magnet close to the first magnet from outside of the composite material structure; and at the taking, the bladder bag main body and the composite material structure are separated from each other by bringing a third magnet having the same magnetic pole as the magnetic pole of the first magnet close to the first magnet from the outside of the composite material structure. With this configuration, uniformity of pressure applied to the inside of the composite material structure is not impaired because the bladder bag main body and the inside of the composite material structure are made close to each other with attraction force of the magnets. Furthermore, the bladder bag can be taken out from the inside of the composite material structure more easily Preferably, the bladder bag further includes a solid member that is provided on a side of an outer surface of the space molding portion of the bladder bag main body; and at the taking, the bladder bag main body and the solid member are taken out simultaneously. With this configuration, the bladder bag main body can be preferably protected from the inner surface of the composite material structure.

Preferably, the narrow molding portion is capable of being connected to and separated from the bladder bag main body; and at the taking, the bladder bag main body is separated from the narrow molding portion and a part of the bladder bag main body remains in a space inside the composite material structure. With this configuration, a part of the bladder bag main body can be integrated with the composite material structure to be preferably reused for, for example, fuel tanks of airplanes, automobiles, vessels, and the like.

Advantageous Effects of Invention

The present invention provides a bladder bag as a mold for molding inside of a composite material structure that can be taken out easily without impairing uniformity of pressure applied to the inside of the composite material structure, and a molding method of the composite material structure that enables the bladder bag to be taken out easily.

DESCRIPTION OF EMBODIMENTS

Hereinafter, embodiments according to the present invention will be described in detail with reference to the drawings. It should be noted that the embodiments do not limit the invention. Components in the following embodiments include components that can be replaced easily by those skilled in the art or are substantially the same components. Furthermore, the components that are described below can be appropriately combined.

First Embodiment

Figure 1:
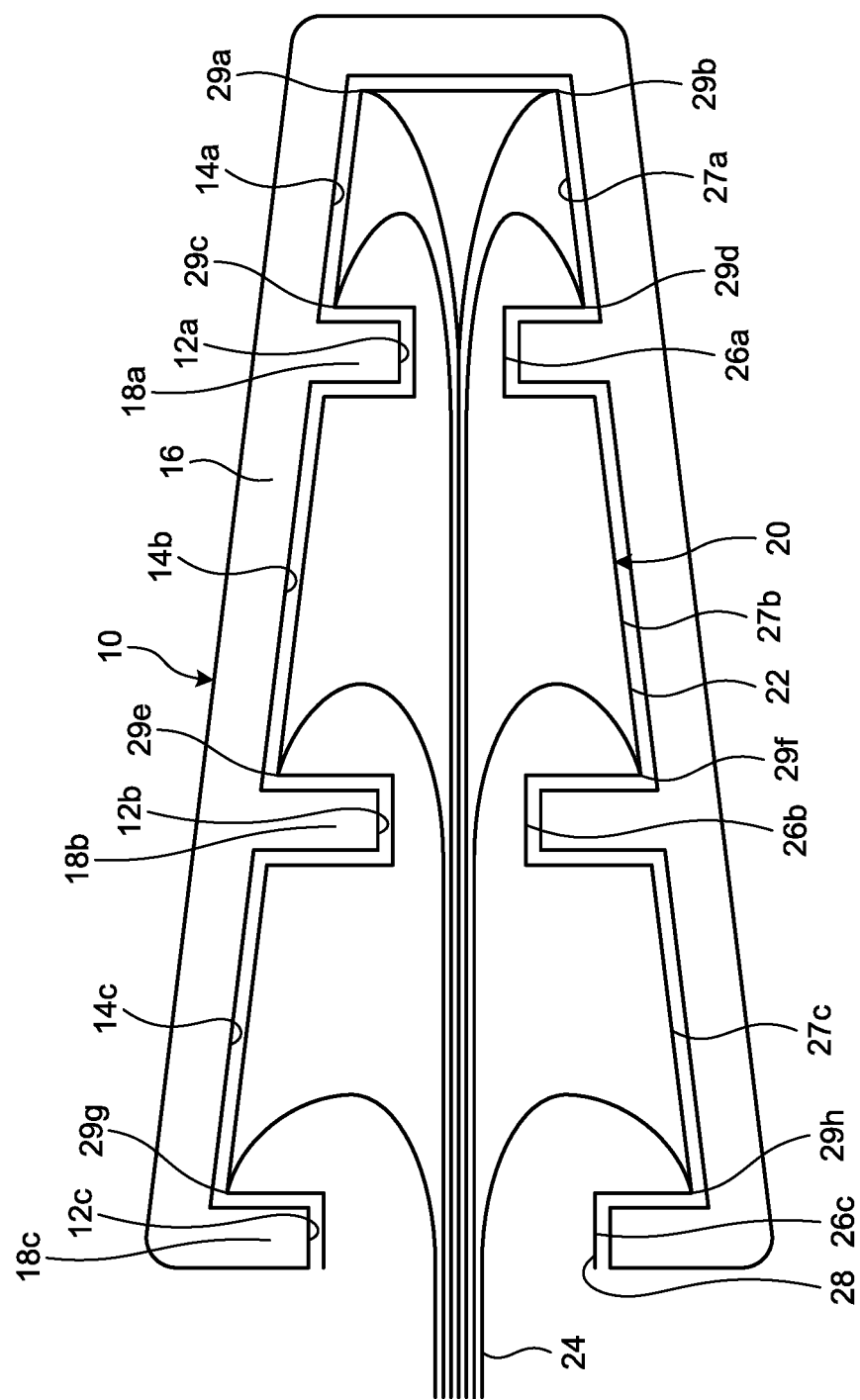
FIG. 1 is a schematic cross-sectional view illustrating a bladder bag and one state in a molding method of a composite material according to a first embodiment.

FIG. 1 is a schematic cross-sectional view illustrating a bladder bag 20 and one state in a molding method of a composite material structure 10 according to a first embodiment. Hereinafter, the composite material structure 1- may simply be referred to as a composite material 10 As illustrated in FIG. 1, the composite material structure 10 includes, from the entrance side toward the deep side in a space inside the composite material 10, a first narrow portion 12a, a second narrow portion 12b, and a third narrow portion 12c formed by narrowing inward a part of the inside of the composite material 10 and a first space portion 14a, a second space portion 14b, and a third space portion 14c formed so as to be adjacent to the narrow portions. As illustrated in FIG. 1, the composite material 10 includes an outer shell portion 16 covering the entire inner space; and a first inner-side projecting portion 18a, a second inner-side projecting portion 18b, and a third inner-side projecting portion 18c each projecting inward from the inner surface of the outer shell portion 16 and respectively narrowing the inner space to form the first narrow portion 12a, the second narrow portion 12b, and the third narrow portion 12c.

The first narrow portion 12a, the second narrow portion 12b, and the third narrow portion 12c are formed in this order from the deep side toward the entrance side inside the composite material 10. That is to say, the first inner-side projecting portion 18a, the second inner-side projecting portion 18b, and the third inner-side projecting portion 18c are formed in this order from the deep side toward the entrance side inside the composite material 10. The first space portion 14a, the second space portion 14b, and the third space portion 14c are formed in this order from the deep side toward the entrance side inside the composite material 10.

The first space portion 14a is formed on the deep side of the first narrow portion 12a, that is, formed on the deep side of the first inner-side projecting portion 18a on the inner side of the outer shell portion 16. The second space portion 14b is formed between the first narrow portion 12a and the second narrow portion 12b, that is, formed between the first inner-side projecting portion 18a and the second inner-side projecting portion 18b on the inner side of the outer shell portion 16. The third space portion 14c is formed between the second narrow portion 12b and the third narrow portion 12c, that is, formed between the second inner-side projecting portion 18b and the third inner-side projecting portion 18c on the inner side of the outer shell portion 16.

The first narrow portion 12a communicates the first space portion 14a and the second space portion 14b with each other. The second narrow portion 12b communicates the second space portion 14b and the third space portion 14c with each other. The third narrow portion 12c forms the entrance of the inner space of the composite material 10.

The outer shell portion 16 has a width that is narrowed in a tapered shape toward the deep side from the entrance side of the inner space. All of the first space portion 14a, the second space portion 14b, and the third space portion 14c formed inside the outer shell portion 16 have widths that are narrowed in tapered shapes toward the deep side from the entrance side of the inner space. Among the first space portion 14a, the second space portion 14b, and the third space portion 14c, the width of the third space portion 14c on the entrance side is the largest, the width of the second space portion 14b at the second place from the entrance side is the next largest, and the width of the first space portion 14a on the deep side of the second space portion 14b is the smallest.

The composite material 10 is made of, for example, a material that is used for airplanes, automobiles, vessels, and the like. The composite material 10 is made of, for example, a material containing reinforcing fibers reinforcing the composite material 10 and resin impregnated into the reinforcing fibers. The reinforcing fibers are formed by, for example, bundling several hundreds to several thousands of basic fibers with a diameter in a range of equal to or larger than 5 μm and equal to or smaller than 7 μm. The basic fibers forming the reinforcing fibers are, for example, carbon fibers. The basic fibers forming the reinforcing fibers are not limited thereto and may be another plastic fibers, glass fibers, or metal fibers. The resin impregnated into the reinforcing fibers is preferably thermosetting resin but may be thermoplastic resin. Examples of the thermosetting resin include epoxy resin. Examples of the thermoplastic resin include polyetheretherketone (PEEK), polyetherketoneketone (PEKK), and polyphenylene sulfide (PPS). It should be noted that the resin impregnated into the reinforcing fibers is not limited thereto and may be another resin.

The bladder bag 20 molds the inside of the composite material 10 by applying pressure thereto from the inside of the composite material 10. As illustrated in FIG. 1, the bladder bag 20 includes a bladder bag main body 22 and a wire 24 as a cord-like member. The bladder bag main body 22 has a bag-like shape, and has properties that it is resistant to heat to be applied thereto in molding the composite material 10, is deformable, and expands in response to introduction of the air thereinto and contracts in response to discharge of the air therefrom. The bladder bag main body 22 is made of a soft heat-resistant material exemplified by silicon rubber. The wire 24 has properties that it is resistant to heat to be applied thereto in molding the composite material 10, can be curved, and is not cut even when pulled. The wire 24 is, for example, a wire made of well-known metal.

The bladder bag main body 22 has a first narrow molding portion 26a, a second narrow molding portion 26b, and a third narrow molding portion 26c for molding, from the inside, the first narrow portion 12a, the second narrow portion 12b, and the third narrow portion 12c, respectively; a first space molding portion 27a, a second space molding portion 27b, and a third space molding portion 27c for molding, from the inside, the first space portion 14a, the second space portion 14b, and the third space portion 14c, respectively; and an air intake 28 for introducing the air into the bladder bag main body 22.

The first narrow molding portion 26a, the second narrow molding portion 26b, and the third narrow molding portion 26c are formed in this order from the deep side toward the entrance side with respect to the air intake 28. The first space molding portion 27a, the second space molding portion 27b, and the third space molding portion 27c are formed in this order from the deep side toward the entrance side with respect to the air intake 28.

The first space molding portion 27a is formed on the deep side of the first narrow molding portion 26a. The second space molding portion 27b is formed between the first narrow molding portion 26a and the second narrow molding portion 26b. The third space molding portion 27c is formed between the second narrow molding portion 26b and the third narrow molding portion 26c.

The first narrow molding portion 26a communicates the first space molding portion 27a and the second space molding portion 27b with each other. The second narrow molding portion 26b communicates the second space molding portion 27b and the third space molding portion 27c with each other. The third narrow molding portion 26c forms the air intake 28.

All of the first space molding portion 27a, the second space molding portion 27b, and the third space molding portion 27c have widths that are narrowed in tapered shapes toward the deep side from the entrance side with respect to the air intake 28. Among the first space molding portion 27a, the second space molding portion 27b, and the third space molding portion 27c, the width of the third space molding portion 27c on the entrance side is the largest, the width of the second space molding portion 27b at the second place from the entrance side is the next largest, and the width of the first space molding portion 27a on the deep side of the second space molding portion 27b is the smallest.

The composite material 10 includes recesses as regions recessed in square shapes from the periphery in the inner surfaces of the first space portion 14a, the second space portion 14b, and the third space portion 14c. To correspond to them, the bladder bag main body 22 includes, in the first space molding portion 27a, the second space molding portion 27b, and the third space molding portion 27c, corner portions projecting in square shapes from the periphery in regions corresponding to the recesses of the composite material 10. To be specific, the bladder bag main body 22 includes a corner portion 29a and a corner portion 29b on the deep side in the first space molding portion 27a and includes a corner portion 29c and a corner portion 29d on the entrance side in the first space molding portion 27a. The bladder bag main body 22 includes a corner portion 29e and a corner portion 29f on the entrance side in the second space molding portion 27b. The bladder bag main body 22 includes a corner portion 29g and a corner portion 29h on the entrance side in the third space molding portion 27c.

The wire 24 is provided in the bladder bag main body 22, passes through at least one of the first narrow molding portion 26a, the second narrow molding portion 26b, and the third narrow molding portion 26c from the air intake 28, and is connected to the inner surface of at least one of the first space molding portion 27a, the second space molding portion 27b, and the third space molding portion 27c. A connection portion between the wire 24 and the inside of the bladder bag main body 22 has properties that it is resistant to heat to be applied thereto in molding the composite material 10 and is not broken even when pulled. A heat-resistant adhesive, for example, is applied to the connection portion between the wire 24 and the inside of the bladder bag main body 22.

The wire 24 is preferably provided in plural and at least one of them is preferably connected to any one of the corner portions exemplified by the corner portion 29a to the corner portion 29h. To be specific, for example, eight wires 24 are provided as illustrated in FIG. 1. One of the wires 24 is connected to the corner portion 29a of the first space molding portion 27a, another one of the wires 24 is connected to the corner portion 29b of the first space molding portion 27a, still another one of the wires 24 is connected to the corner portion 29c of the first space molding portion 27a, and still another one of the wires 24 is connected to the corner portion 29d of the first space molding portion 27a. Still another one of the wires 24 is connected to the corner portion 29e of the second space molding portion 27b, still another one of the wires 24 is connected to the corner portion 29f of the second space molding portion 27b, still another one of the wires 24 is connected to the corner portion 29g of the third space molding portion 27c, and still another one of the wires 24 is connected to the corner portion 29h of the third space molding portion 27c.

The bladder bag 20 has the above-mentioned configuration, and uniformity of pressure applied to the inside of the composite material 10 is therefore not impaired. The bladder bag 20 can be easily taken out from the inside of the composite material 10 by pulling the wires 24 as the cord-like members.

In the bladder bag 20, at least one of the wires 24 as the cord-like members is connected to the corner portion of the space molding portion. With this configuration, the bladder bag main body 22 can be separated from the inside of the composite material 10 using, as a point of origin, the corner portion of the bladder bag main body 22 that tends to be caught by the recess of the composite material 10 when the bladder bag 20 is taken out, so that the bladder bag 20 can be taken out from the inside of the composite material 10 more easily.

Figure 2:
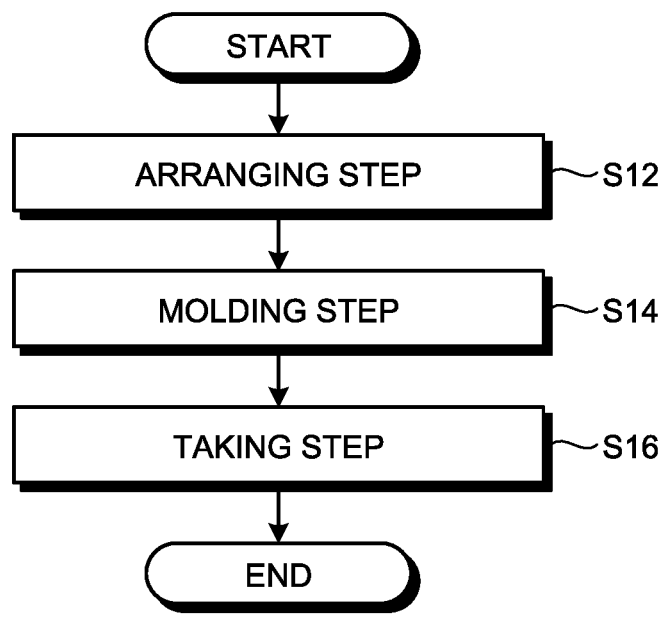
FIG. 2 is a flowchart illustrating the molding method of the composite material in the first embodiment.

FIG. 2 is a flowchart illustrating the molding method of the composite material 10 in the first embodiment. The molding method of the composite material 10 in the first embodiment will be described with reference to FIGS. 1 and 2. The molding method of the composite material 10 includes an arranging step (step S12), a molding step (step S14), and a taking step (step S16), as illustrated in FIG. 2.

First, the bladder bag 20 is arranged inside the composite material 10 before molded (step S12). To be specific, first, the bladder bag main body 22 is inserted from the side of the entrance of the space of the composite material 10 before molded while the first space molding portion 27a is directed to the deep side in the space of the composite material 10 before molded. Then, the outer surfaces of the first narrow molding portion 26a, the second narrow molding portion 26b, and the third narrow molding portion 26c of the bladder bag main body 22 are made to respectively face the inner surfaces of the first narrow portion 12a, the second narrow portion 12b, and the third narrow portion 12c of the composite material 10 before molded. The outer surfaces of the first space molding portion 27a, the second space molding portion 27b, and the third space molding portion 27c of the bladder bag main body 22 are made to respectively face the inner surfaces of the first space portion 14a, the second space portion 14b, and the third space portion 14c of the composite material 10 before molded. The inner surface of the entrance of the space of the composite material 10 before molded is made to face the outer surface of the air intake 28 of the bladder bag main body 22.

Subsequently, the bladder bag main body 22 of the bladder bag 20 arranged at step S12 is made to expand with the air by introducing the air thereinto from the air intake 28 of the bladder bag main body 22. As illustrated in FIG. 1, the outer surfaces of the first narrow molding portion 26a, the second narrow molding portion 26b, and the third narrow molding portion 26c of the bladder bag main body 22 that has expanded with the air respectively make close to the inner surfaces of the first narrow portion 12a, the second narrow portion 12b, and the third narrow portion 12c of the composite material 10 before molded, and the outer surfaces of the first space molding portion 27a, the second space molding portion 27b, and the third space molding portion 27c of the bladder bag main body 22 respectively make close to the inner surfaces of the first space portion 14a, the second space portion 14b, and the third space portion 14c of the composite material 10 before molded. The bladder bag main body 22 that has expanded with the air makes contact with the inner surface of the composite material 10 and applies pressure to the inside of the composite material 10 based on pressure of the introduced air. To be specific, the outer surfaces of the first narrow molding portion 26a, the second narrow molding portion 26b, and the third narrow molding portion 26c of the bladder bag main body 22 that has expanded with the air respectively apply pressure to the inner surfaces of the first narrow portion 12a, the second narrow portion 12b, and the third narrow portion 12c of the composite material 10 before molded, and the outer surfaces of the first space molding portion 27a, the second space molding portion 27b, and the third space molding portion 27c of the bladder bag main body 22 respectively apply pressure to the inner surfaces of the first space portion 14a, the second space portion 14b, and the third space portion 14c of the composite material 10 before molded. Simultaneously, pressure is applied to the outer surface of the outer shell portion 16 from the outside of the composite material 10. The composite material 10 is molded by heating the composite material 10 in the state in which the bladder bag main body 22 that has expanded with the air applies pressure to the inside of the composite material 10 and the pressure is applied also from the outside of the composite material (step S14).

Then, after step S14, the bladder bag main body 22 is made to moderately contract by moderately discharging the air in the bladder bag main body 22 that has expanded with the air. The bladder bag main body 22 is separated from the inside of the composite material 10 by pulling the wires 24 from the direction of the air intake 28 in the state in which the bladder bag main body 22 has moderately contracted. The bladder bag 20 is taken out from the inside of the composite material 10 by pulling out the bladder bag main body 22 from the direction of the air intake 28 while discharging the air in the bladder bag main body 22 after the bladder bag main body 22 is separated from the inside of the composite material 10 (step S16).

The molding method of the composite material 10 in the first embodiment has the above-mentioned configuration, and uniformity of pressure applied to the inside of the composite material 10 is therefore not impaired. The molding method of the composite material 10 in the first embodiment enables the bladder bag 20 to be easily taken out from the inside of the composite material 10 by pulling the wires 24 as the cord-like members.

Figure 3:
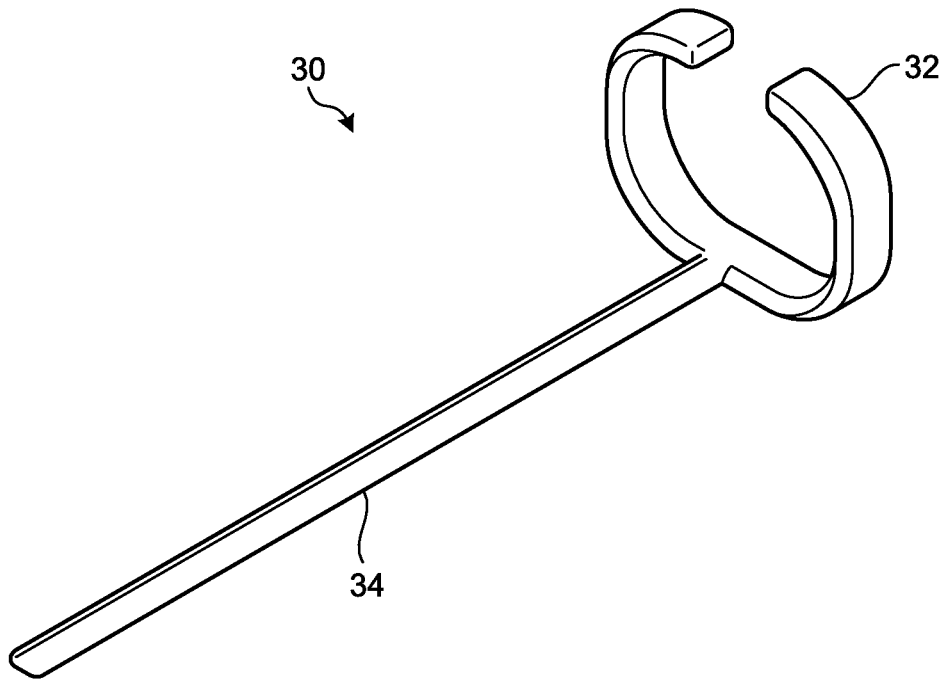
FIG. 3 is a schematic configuration view of a wire hooking rod that is used for the molding method of the composite material in the first embodiment.
Figure 4:
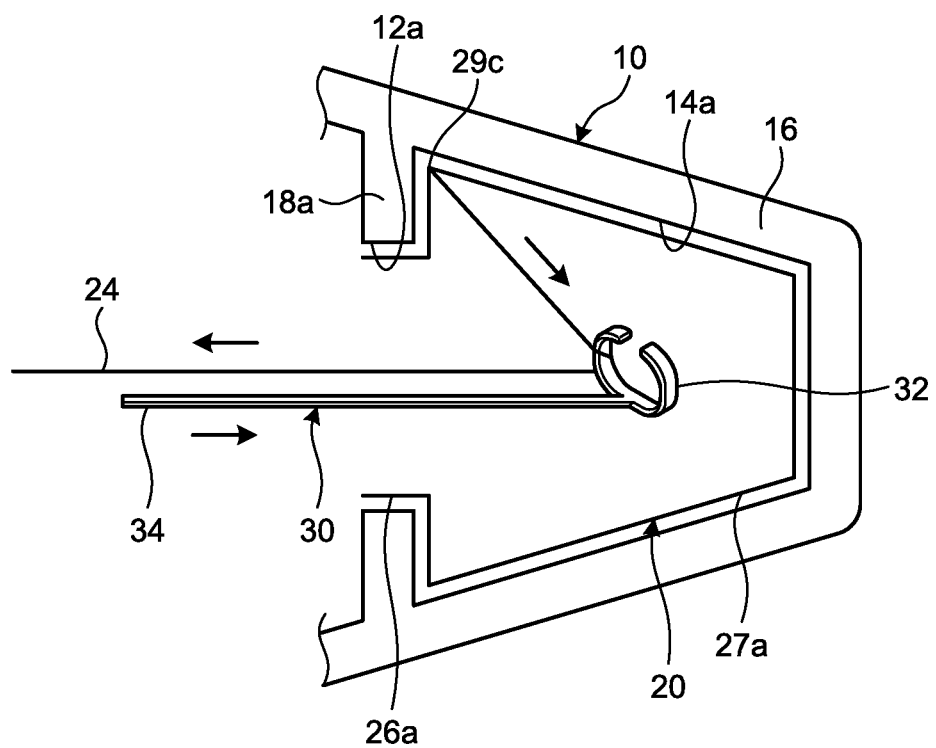
FIG. 4 is a schematic configuration view illustrating one state in the molding method of the composite material in the first embodiment.

FIG. 3 is a schematic configuration view of a wire hooking rod 30 that is used for the molding method of the composite material 10 in the first embodiment. FIG. 4 is a schematic configuration view illustrating one state in the molding method of the composite material 10 in the first embodiment. The wire hooking rod 30 is a hooking rod on which the wires 24 as the cord-like members are hooked, and, as illustrated in FIG. 3, has a C-shaped wire hooking portion 32 on which the wires 24 are hooked and a rod portion 34 with a predetermined length the front end of which is connected to the wire hooking portion 32. The wires 24 can be hooked on the wire hooking portion 32 at both sides of the C shape. The rod portion 34 is longer than the inside of the composite material 10, enables the wire hooking portion 32 to be introduced into the deep side in the composite material 10, and enables the wires 24 hooked on the wire hooking portion 32 to be pulled from the outside of the air intake 28.

At step S16, the wires 24 are preferably pulled from the direction of the air intake 28 after the bladder bag main body 22 is separated from the inside of the composite material 10 by hooking the wires 24 on the wire hooking portion 32 of the wire hooking rod 30 and pulling the hooked wires 24 in the direction of separating the bladder bag main body 22 from the inside of the composite material 10. In this case, the bladder bag 20 can be taken out from the inside of the composite material 10 more easily by pulling the wires 24 as the cord-like members.

It is more preferable that at least one of the wires 24 be connected to the corner portion. To be specific, for example, as illustrated in FIG. 4, when one of the wires 24 is connected to the corner portion 29c, the bladder bag main body 22 can be separated from the inside of the composite material 10 in the vicinity of the corner portion 29c by pulling the wire 24 in the direction opposite to the projecting direction of the corner portion 29c, that is, the direction of a right downward arrow in FIG. 4. When the bladder bag main body 22 is pulled out in the direction to the side of the entrance of the inside of the composite material 10, that is, the direction of a leftward arrow in FIG. 4 thereafter, the corner portion 29c of the bladder bag main body 22 can be prevented from being caught by the recess of the composite material 10. The bladder bag main body 22 can be easily pulled out from the entrance of the inside of the composite material 10 by pulling the wires 24 from the direction of the air intake 28 in the state in which the bladder bag main body 22 has been separated from the inside of the composite material 10. The bladder bag 20 can therefore be taken out from the inside of the composite material 10 more easily.

Second Embodiment

Figure 5:
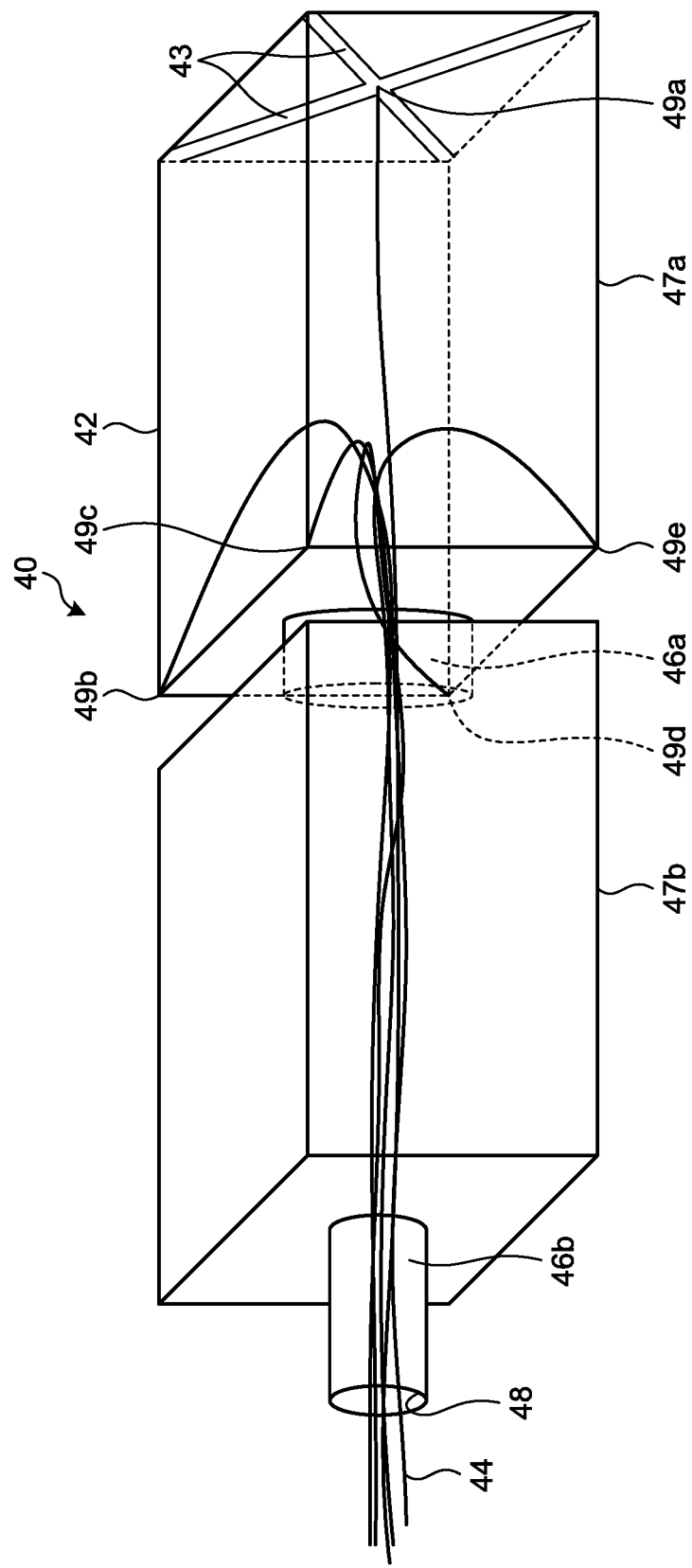
FIG. 5 is a schematic cross-sectional view illustrating a bladder bag according to a second embodiment.

FIG. 5 is a schematic cross-sectional view illustrating a bladder bag 40 according to a second embodiment. The bladder bag 40 molds the inside of a composite material made of a similar material to that of the composite material 10 by applying pressure thereto from the inside of the composite material. The composite material that the bladder bag 40 molds is different from the composite material 10 having the three narrow portions and the three space portions in that it has two narrow portions and two space portions, and is similar to the composite material 10 in the other points. As illustrated in FIG. 5, the bladder bag 40 includes a bladder bag main body 42 and a wire 44 as a cord-like member. The bladder bag main body 42 has similar properties to those of the bladder bag main body 22 other than a shape thereof as will be described later, and is made of the similar material. The wire 44 has similar properties to those of the wire 24 other than a connected place thereof, and is made of a similar material.

The bladder bag main body 42 includes a first narrow molding portion 46a and a second narrow molding portion 46b for molding, from the inside, a first narrow portion and a second narrow portion of the composite material, respectively; a first space molding portion 47a and a second space molding portion 47b for molding, from the inside, a first space portion and a second space portion, respectively; and an air intake 48 for introducing the air into the bladder bag main body 42.

The first narrow molding portion 46a and the second narrow molding portion 46b are formed in this order from the deep side toward the entrance side with respect to the air intake 48 of the bladder bag main body 42. The first space molding portion 47a and the second space molding portion 47b are formed in this order from the deep side toward the entrance side with respect to the air intake 48 of the bladder bag main body 42. The first space molding portion 47a is formed on the deep side of the first narrow molding portion 46a, and the second space molding portion 47b is formed between the first narrow molding portion 46a and the second narrow molding portion 46b. The first narrow molding portion 46a communicates the first space molding portion 47a and the second space molding portion 47b with each other. The second narrow molding portion 46b forms the air intake 48. Both of the first space molding portion 47a and the second space molding portion 47b have rectangular parallelepiped shapes. The first space molding portion 47a and the second space molding portion 47b have the same width. The shapes of the first space molding portion 47a and the second space molding portion 47b are not limited to the above-mentioned shapes and may be desired shapes as long as they are formed so as to extend in the inward direction with respect to the first narrow molding portion 46a and the second narrow molding portion 46b.

The bladder bag main body 42 includes, on the deep side of the first space molding portion 47a, glass cloth 43 as a reinforcing member that reinforces the first space molding portion 47a. The bladder bag main body 42 includes, on the deep side of the first space molding portion 47a, a reinforcing part 49a as a part reinforced by the glass cloth 43. When the first space molding portion 47a has the rectangular parallelepiped shape, two pieces of glass cloth 43 are provided in an intersecting manner so as to connect diagonal corners of the surface having a rectangular shape on the deep side. An intersection of the two pieces of intersecting glass cloth 43 corresponds to the reinforcing part 49a. That is to say, the reinforcing part 49a is provided at the center of the surface having the rectangular shape on the deep side.

The bladder bag main body 42 includes, in the first space molding portion 47a and the second space molding portion 47b, corner portions projecting in square shapes from the periphery in regions corresponding to recesses formed in the inner surfaces of the first space portion and the second space portion of the composite material. To be specific, the bladder bag main body 42 includes a corner portion 49b, a corner portion 49c, a corner portion 49d, and a corner portion 49e in the first space molding portion 47a on the entrance side.

The wire 44 is provided in the bladder bag main body 42, passes through at least one of the first narrow molding portion 46a and the second narrow molding portion 46b from the air intake 48, and is connected to at least one of the inner surfaces of the first space molding portion 47a and the second space molding portion 47b. A connection portion between the wire 44 and the inside of the bladder bag main body 42 has similar properties to those of the connection portion between the wire 24 and the bladder bag main body 22, and is made of a similar material. The wire 44 is preferably provided in plural and at least one of them is preferably connected to the glass cloth 43 as the reinforcing member or the reinforcing part exemplified by the reinforcing part 49a. At least one of the wires 44 is preferably connected to any one of the corner portions exemplified by the corner portion 49b to the corner portion 49e. To be specific, for example, five wires 44 are provided as illustrated in FIG. 5. One of the wires 44 is connected to the reinforcing part 49a on the deep side of the first space molding portion 47a. Another one of the wires 44 is connected to the corner portion 49b of the first space molding portion 47a, still another one of the wires 44 is connected to the corner portion 49c of the first space molding portion 47a, still another one of the wires 44 is connected to the corner portion 49d of the first space molding portion 47a, and still another one of the wires 44 is connected to the corner portion 49e of the first space molding portion 47a.

The bladder bag 40 has the above-mentioned configuration, and uniformity of the pressure applied to the inside of the composite material is therefore not impaired. The bladder bag 40 can be easily taken out from the inside of the composite material by pulling the wires 44 as the cord-like members.

In the bladder bag 40, at least one of the wires 44 as the cord-like members is connected to the corner portion of the space molding portion. The bladder bag main body 42 can therefore be separated from the inside of the composite material using, as a point of origin, the corner portion of the bladder bag main body 42 that tends to be caught by the recess of the composite material when the bladder bag 40 is taken out, so that the bladder bag 40 can be taken out from the inside of the composite material more easily.

The bladder bag 40 includes the glass cloth 43 as the reinforcing member that reinforces the first space molding portion 47a on the deep side of the first space molding portion 47a, and at least one of the wires 44 as the cord-like members is connected to the reinforcing part 49a as the part reinforced by the glass cloth 43. With the bladder bag 40, when the wires 44 as the cord-like members are pulled for taking out the bladder bag 40, the portions of the bladder bag main body 42 to which the wires 44 are connected can therefore be preferably protected from tensile force with the wires 44.

A molding method of the composite material 10 using the bladder bag 40 is similar to the molding method of the composite material 10 in the first embodiment other than the point that the method uses the bladder bag 40, and detailed description thereof is therefore omitted. The molding method of the composite material 10 using the bladder bag 40 enables the portions of the bladder bag main body 42 to which the wires 44 as the cord-like members are connected to be preferably protected from the tensile force with the wires 44 when the wires 44 are pulled for taking out the bladder bag 40 because the method uses the bladder bag 40 having the above-mentioned configuration.

Third Embodiment

Figure 6:
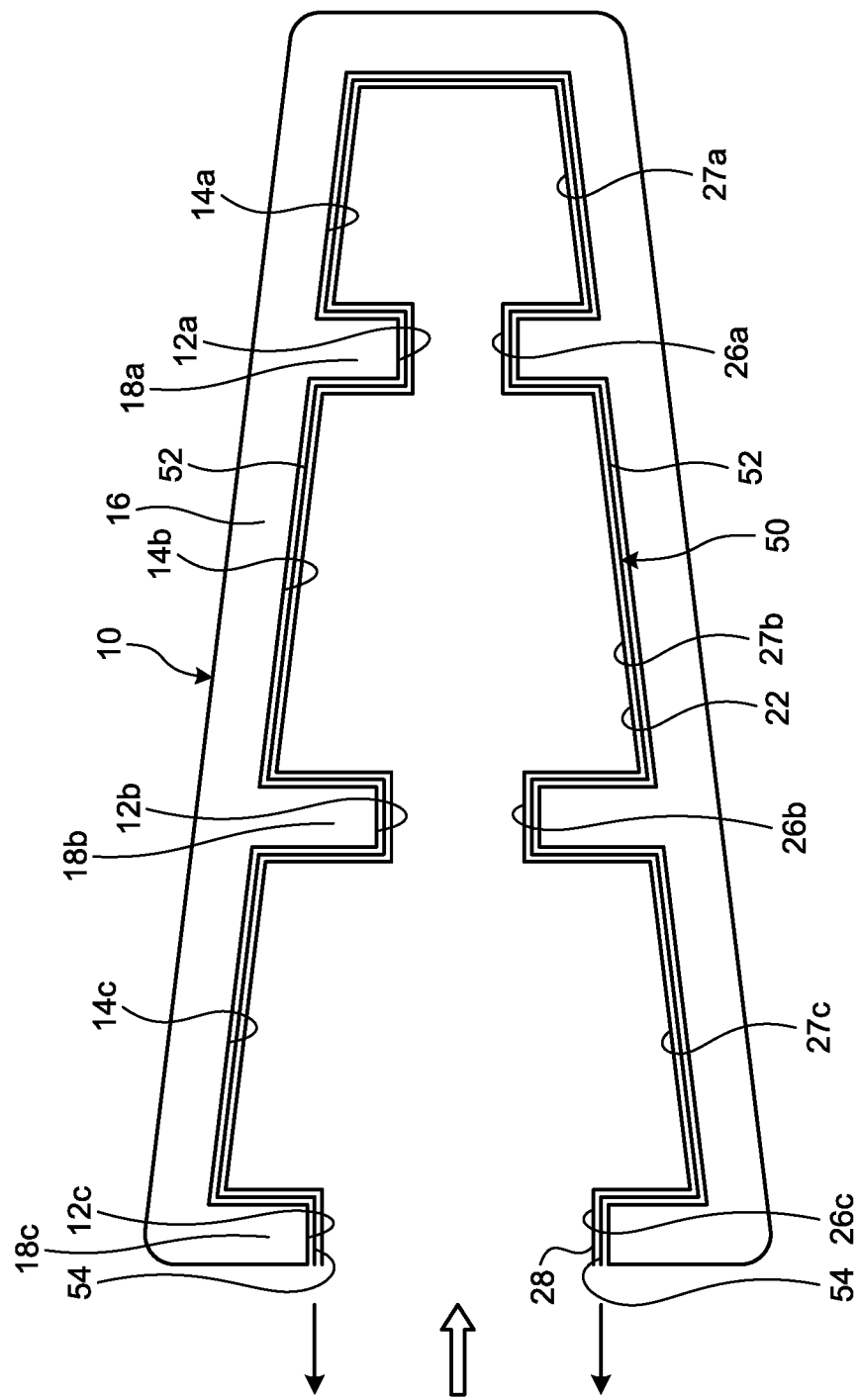
FIG. 6 is a schematic cross-sectional view illustrating a bladder bag and one state in a molding method of a composite material according to a third embodiment.
Figure 7:
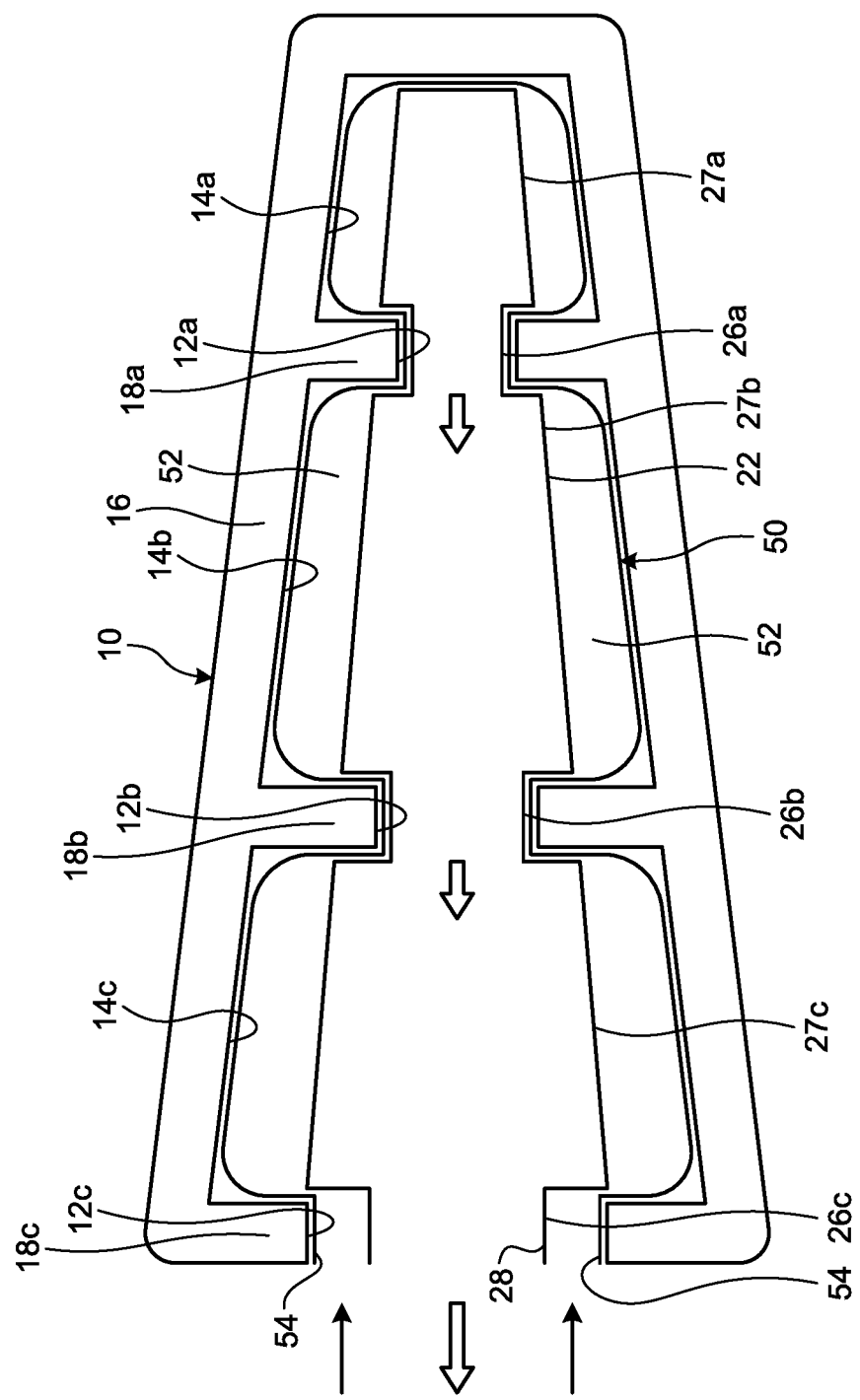
FIG. 7 is a schematic cross-sectional view illustrating the bladder bag and one state in the molding method of the composite material in the third embodiment.

FIG. 6 is a schematic cross-sectional view illustrating a bladder bag 50 and one state in a molding method of the composite material 10 according to a third embodiment. FIG. 7 is a schematic cross-sectional view illustrating the bladder bag 50 and one state in the molding method of the composite material 10 in the third embodiment. The bladder bag 50 molds the inside of the composite material 10 by applying pressure thereto from the inside of the composite material 10. The bladder bag 50 is formed by replacing the wires 24 in the bladder bag 20 with a deaerating circuit 52. In description of the third embodiment, the same reference numeral groups as those in the first embodiment denote similar configurations to those in the first embodiment and detailed description thereof is omitted.

As illustrated in FIGS. 6 and 7, the bladder bag 50 includes the bladder bag main body 22 and the deaerating circuit 52. The deaerating circuit 52 is provided along at least a part of the outer surface of the bladder bag main body 22. The deaerating circuit 52 is exemplified by cloth having a band-like surface wound along at least a part of the outer surface of the bladder bag main body 22. The deaerating circuit 52 is not limited to this example and may be provided on the entire periphery of the outer surface of the bladder bag main body 22, and the bladder bag main body 22 and the deaerating circuit 52 may be overlapped so as to form a double structure. The deaerating circuit 52 includes a deaerating circuit port 54 for introducing the air thereinto and discharging the air therefrom. The deaerating circuit 52 is arranged between the bladder bag main body 22 and the composite material 10 when the composite material 10 is formed. In this case, the deaerating circuit port 54 is arranged between the air intake 28 of the bladder bag main body 22 and the entrance of the space of the inside of the composite material 10. As illustrated in FIG. 6, the deaerating circuit 52 makes the bladder bag main body 22 and the composite material 10 close to each other by discharging the air in the deaerating circuit 52 from the deaerating circuit port 54. As illustrated in FIG. 7, the deaerating circuit 52 separates the bladder bag main body 22 and the composite material 10 from each other by introducing the air into the deaerating circuit 52 from the deaerating circuit port 54.

A gas discharge circuit for discharging gas generated from the composite material 10 during molding of the composite material 10 may be further provided outside the deaerating circuit 52. The gas discharge circuit is exemplified by glass cloth bonded to the outer side of the deaerating circuit 52.

The bladder bag 50 has the above-mentioned configuration, and uniformity of pressure applied to the inside of the composite material 10 is therefore not impaired because the bladder bag main body 22 and the inside of the composite material 10 are made close to each other by discharging the air in the deaerating circuit 52. The bladder bag 50 can be easily taken out from the inside of the composite material 10 by introducing the air into the deaerating circuit 52.

The bladder bag 50 is taken out while the bladder bag main body 22 and the deaerating circuit 52 are simultaneously taken out from the inside of the composite material 10 in some cases, and the bladder bag 50 is taken out while the bladder bag main body 22 and the deaerating circuit 52 are separately taken out from the inside of the composite material 10 in other cases. When the bladder bag main body 22 and the deaerating circuit 52 are simultaneously taken out from the inside of the composite material 10, it is needless to say that the bladder bag 50 can be easily taken out from the inside of the composite material 10. When the bladder bag main body 22 and the deaerating circuit 52 are separately taken out from the inside of the composite material 10, the bladder bag 50 is taken out in such a manner that the bladder bag main body 22 is easily taken out first, and then, the deaerating circuit 52 is taken out. The deaerating circuit 52 separated from the bladder bag main body 22 can be easily taken out by being pulled to the deaerating circuit port 54 side. Accordingly, even when the bladder bag main body 22 and the deaerating circuit 52 are separately taken out from the inside of the composite material 10, the bladder bag 50 can be easily taken out from the inside of the composite material 10.

A molding method of the composite material 10 in the third embodiment will be described. The molding method of the composite material 10 in the third embodiment includes an arranging step (step S12), a molding step (step S14), and a taking step (step S16) in a similar manner to the first embodiment.

At step S12 in the molding method of the composite material 10 in the third embodiment, the bladder bag 20 arranged inside the composite material 10 before molded in the first embodiment is replaced by the bladder bag 50. At step S12 in the molding method of the composite material 10 in the third embodiment, in addition to insertion of the bladder bag main body 22 and arrangement of the molding portions of the bladder bag main body 22 as in the first embodiment, the deaerating circuit 52 is arranged between the bladder bag main body 22 and the composite material 10.

At step S14 in the molding method of the composite material 10 in the third embodiment, discharge of the air in the deaerating circuit 52 from the deaerating circuit port 54 is further added to the processing in the first embodiment. At step S14 in the molding method of the composite material 10 in the third embodiment, the bladder bag main body 22 is made to expand with the air by introducing the air from the air intake 28 of the bladder bag main body 22 arranged at step S12 in a similar manner to the first embodiment. At step S14 in the molding method of the composite material 10 in the third embodiment, in addition to this processing, the air in the deaerating circuit 52 is discharged from the deaerating circuit port 54 to thereby make the bladder bag main body 22 and the composite material 10 close to each other, as illustrated in FIG. 6. That is to say, a gap between the bladder bag main body 22 and the composite material 10 is reduced to a minimum level with the deaerating circuit 52. At step S14 in the molding method of the composite material 10 in the third embodiment, in a similar manner to the first embodiment, the bladder bag main body 22 that has expanded with the air makes contact with the inner surface of the composite material 10 and applies pressure to the inside of the composite material 10 based on the pressure of the introduced air, and the composite material 10 is heated in the state in which the bladder bag main body 22 that has expanded with the air applies pressure to the inside of the composite material 10, so that the composite material 10 is molded.

At step S16 in the molding method of the composite material 10 in the third embodiment, when the bladder bag main body 22 is separated from the inside of the composite material 10, pulling the wires 24 from the direction of the air intake 28 in the first embodiment is replaced by introduction of the air into the deaerating circuit 52 from the deaerating circuit port 54. At step S16 in the molding method of the composite material 10 in the third embodiment, the bladder bag main body 22 is made to contract by discharging the air in the bladder bag main body 22 that has expanded with the air in a similar manner to the first embodiment. At step S16 in the molding method of the composite material 10 in the third embodiment, in addition to this processing, as illustrated in FIG. 7, the bladder bag main body 22 and the composite material 10 are separated from each other by introducing the air into the deaerating circuit 52 from the deaerating circuit port 54 and enlarging the gap between the bladder bag main body 22 and the composite material 10. At step S16 in the molding method of the composite material 10 in the third embodiment, the bladder bag 50 is taken out from the inside of the composite material 10 by pulling out the bladder bag main body 22 from the direction of the air intake 28 after the bladder bag main body 22 is separated from the inside of the composite material 10 in a similar manner to the first embodiment.

The molding method of the composite material 10 in the third embodiment has the above-mentioned configuration, and uniformity of the pressure applied to the inside of the composite material 10 is therefore not impaired because the bladder bag main body 22 and the inside of the composite material 10 are made close to each other by discharging the air in the deaerating circuit 52. The bladder bag 50 can be easily taken out from the inside of the composite material 10 by introducing the air into the deaerating circuit 52 and enlarging the gap between the bladder bag main body 22 and the composite material 10.

Fourth Embodiment

Figure 8:
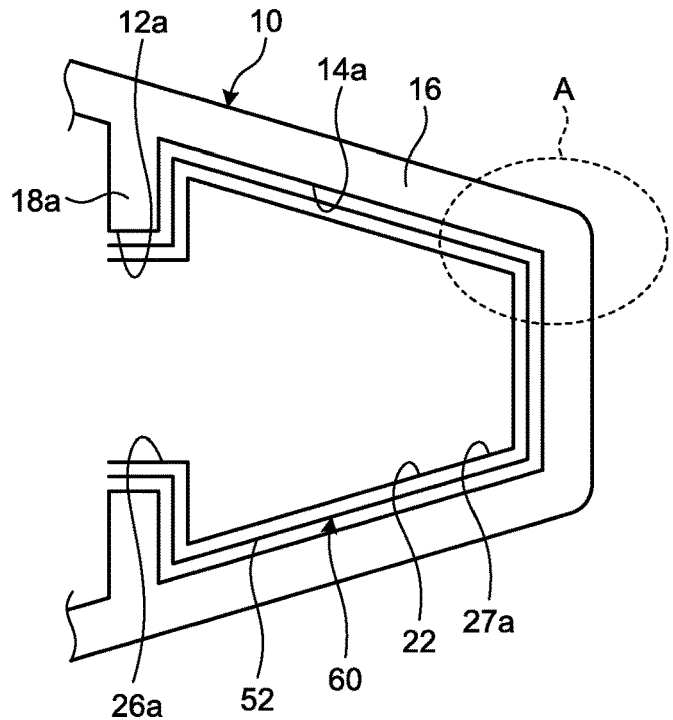
FIG. 8 is a schematic cross-sectional view illustrating a part of a bladder bag and one state in a molding method of a composite material according to a fourth embodiment.
Figure 9:
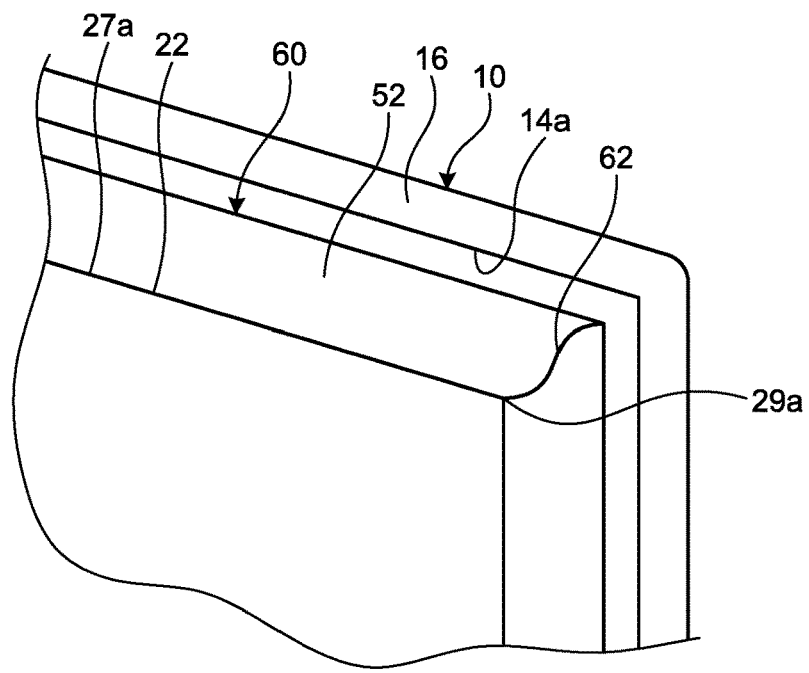
FIG. 9 is an enlarged view of a region A in FIG. 8 and is a schematic cross-sectional view illustrating details of a part of the bladder bag and one state in the molding method of the composite material in the fourth embodiment.
Figure 10:
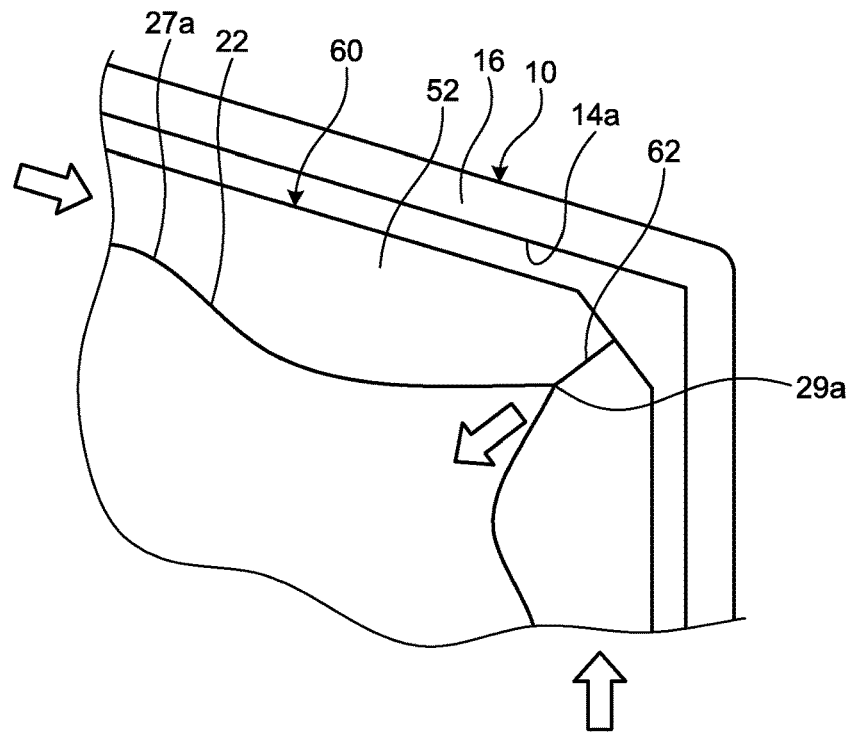
FIG. 10 is an enlarged view of the region A in FIG. 8 and is a schematic cross-sectional view illustrating one state in the molding method of the composite material in the fourth embodiment.

FIG. 8 is a schematic cross-sectional view illustrating a part of a bladder bag 60 and one state in a molding method of the composite material 10 according to a fourth embodiment. FIG. 9 is an enlarged view of a region A in FIG. 8 and is a schematic cross-sectional view illustrating details of a part of the bladder bag 60 and one state in the molding method of the composite material 10 in the fourth embodiment. FIG. 10 is an enlarged view of the region A in FIG. 8 and is a schematic cross-sectional view illustrating one state in the molding method of the composite material 10 in the fourth embodiment. The region A in FIG. 8 is a part of a region on the deep side of the space inside the composite material 10 and includes a part of the bladder bag 60 on the deep side and a part of the composite material 10 on the deep side. The bladder bag 60 molds the inside of the composite material 10 by applying pressure thereto from the inside of the composite material 10. The bladder bag 60 is formed by additionally providing a string 62 connecting the bladder bag main body 22 and the deaerating circuit 52 in the bladder bag 50. In description of the fourth embodiment, the same reference numeral groups as those in the third embodiment denote similar configurations to those in the third embodiment and detailed description thereof is omitted.

As illustrated in FIGS. 8, 9, and 10, the bladder bag 60 includes the bladder bag main body 22, the deaerating circuit 52, and the string 62 connecting the bladder bag main body 22 and the deaerating circuit 52. The string 62 has properties that it is resistant to heat to be applied thereto in molding the composite material 10 and is not cut even when pulled. As illustrated in FIGS. 9 and 10, the string 62 is connected to the corner portion 29a of the first space molding portion 27a. It should be noted that the string 62 may be provided on another space molding portion and may be provided on the corner portion of another space molding portion.

The bladder bag 60 has the above-mentioned configuration, and when the air is introduced into the deaerating circuit 52, tensile force is generated on the string 62, and the deaerating circuit 52 can be separated from the inside of the composite material 10. Accordingly, the bladder bag main body 22 and the deaerating circuit 52 can be simultaneously taken out from the inside of the composite material 10 by the string 62, so that the bladder bag 60 can be taken out from the inside of the composite material 10 more easily.

In the bladder bag 60, the string 62 is connected to the corner portion 29a of the first space molding portion 27a of the bladder bag main body 22. With this configuration, the deaerating circuit 52 can be separated from the inside of the composite material 10 using, as a point of origin, the corner portion 29a of the bladder bag main body 22 that tends to be caught by the recess of the composite material 10 when the bladder bag 60 is taken out, so that the bladder bag 60 can be taken out from the inside of the composite material 10 more easily. The same holds true for the case in which the string 62 is provided on another corner portion.

A molding method of the composite material 10 in the fourth embodiment will be described. The molding method of the composite material 10 in the fourth embodiment includes an arranging step (step S12), a molding step (step S14), and a taking step (step S16) in a similar manner to the third embodiment. At step S12 and step S14 in the molding method of the composite material 10 in the fourth embodiment, the bladder bag 50 in the third embodiment is replaced by the bladder bag 60.

At step S16 in the molding method of the composite material 10 in the fourth embodiment, when the bladder bag main body 22 and the composite material 10 are separated from each other in the third embodiment, separation of the deaerating circuit 52 from the inside of the composite material 10 by pulling the deaerating circuit 52 to the bladder bag main body 22 side with the tensile force generated in the string 62 is added.

The molding method of the composite material 10 in the fourth embodiment has the above-mentioned configuration and therefore enables the bladder bag main body 22 and the deaerating circuit 52 to be simultaneously taken out from the inside of the composite material 10 by the string 62, so that the bladder bag 60 can be taken out from the inside of the composite material 10 more easily.

The molding method of the composite material 10 in the fourth embodiment is preferable because the string 62 of the bladder bag 60 is connected to the corner portion 29a of the first space molding portion 27a of the bladder bag main body 22. With this configuration, the molding method of the composite material 10 in the fourth embodiment enables the deaerating circuit 52 to be separated from the inside of the composite material 10 using, as the point of origin, the corner portion 29a of the bladder bag main body 22 that tends to be caught by the recess of the composite material 10 when the bladder bag 60 is taken out, so that the bladder bag 60 can be taken out from the inside of the composite material 10 more easily.

Fifth Embodiment

Figure 11:
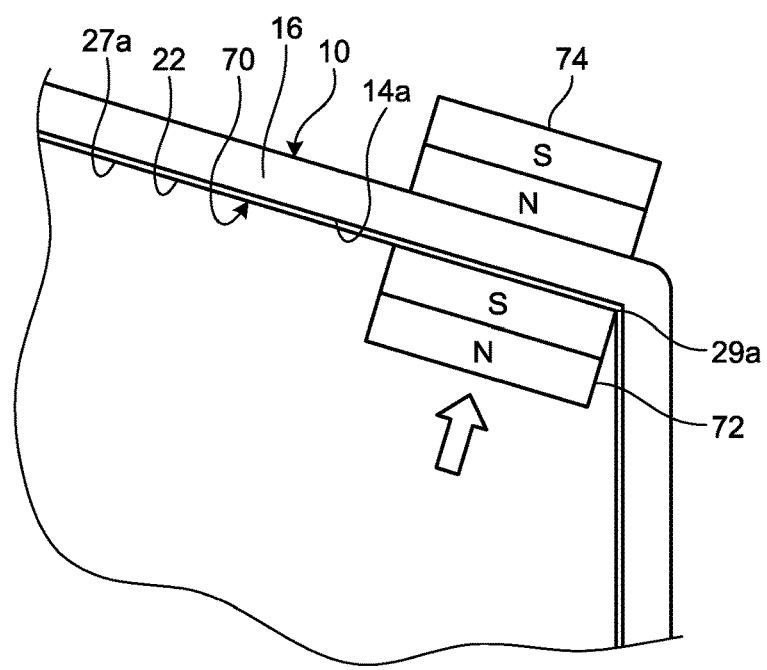
FIG. 11 is a schematic cross-sectional view illustrating a bladder bag and one state in a molding method of a composite material according to a fifth embodiment.
Figure 12:
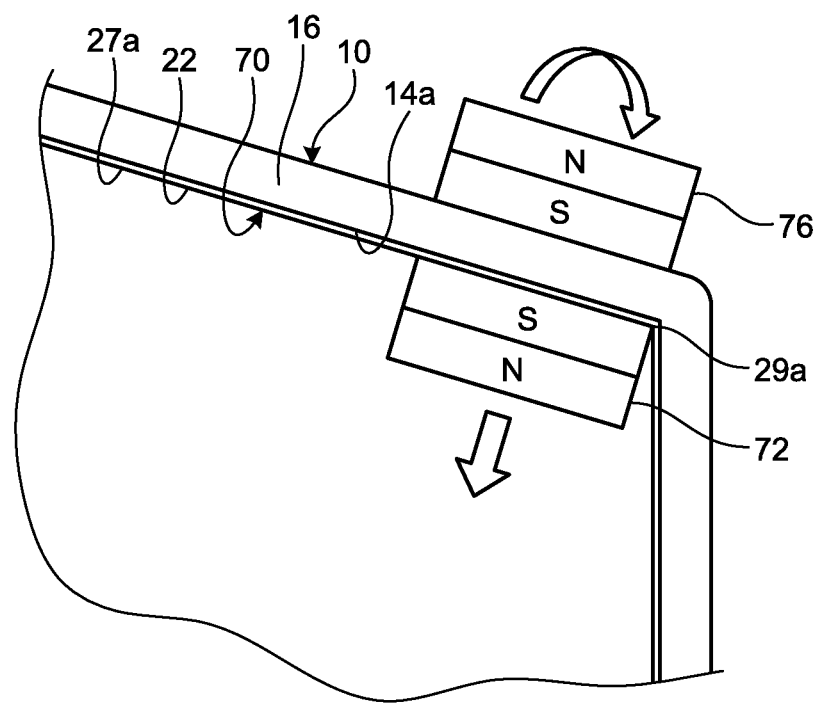
FIG. 12 is a schematic cross-sectional view illustrating the bladder bag and one state in the molding method of the composite material in the fifth embodiment.

FIG. 11 is a schematic cross-sectional view illustrating a bladder bag 70 and one state in a molding method of the composite material 10 according to a fifth embodiment. FIG. 12 is a schematic cross-sectional view illustrating the bladder bag 70 and one state in the molding method of the composite material 10 in the fifth embodiment. Both of FIGS. 11 and 12 are enlarged views of a region corresponding to the above-mentioned region A. The bladder bag 70 molds the inside of the composite material 10 by applying pressure thereto from the inside of the composite material 10. The bladder bag 70 is formed by additionally providing a magnet 72 in the first space molding portion 27a of the bladder bag main body 22 in the bladder bag 20. In FIGS. 11 and 12, the wires 24 are not illustrated. In description of the fifth embodiment, the same reference numeral groups as those in the first embodiment denote similar configurations to those in the first embodiment and detailed description thereof is omitted.

As illustrated in FIGS. 11 and 12, the bladder bag 70 further includes the magnet 72 provided in the first space molding portion 27a of the bladder bag main body 22. The magnet 72 has properties that it is resistant to heat to be applied thereto in molding the composite material 10, and a magnetic pole thereof is not changed with heat. As illustrated in FIG. 11, the magnet 72 makes the bladder bag main body 22 and the composite material 10 close to each other with attraction force acting between the magnet 72 and another magnet 74 having a magnetic pole differing from that of the magnet 72 by bringing the magnet 74 close to the magnet 72 from the outside of the composite material 10. As illustrated in FIG. 12, the magnet 72 separates the bladder bag main body 22 and the composite material 10 from each other with repulsive force acting between the magnet 72 and another magnet 76 having the same magnetic pole as that of the magnet 72 by bringing the magnet 76 close to the magnet 72 from the outside of the composite material 10. The bladder bag main body 22 and the composite material 10 may be made close to or separated from each other by using, the magnet 74 and the magnet 76, the same electromagnets and changing directions of currents flowing through coils wound around the electromagnets to switch the magnetic poles thereof.

The bladder bag 70 has the above-mentioned configuration, and uniformity of the pressure applied to the inside of the composite material is therefore not impaired because the bladder bag main body 22 and the inside of the composite material 10 are made close to each other with the attraction force acting between the magnet 72 and the magnet 74. The bladder bag 70 can be taken out from the inside of the composite material 10 more easily with the repulsive force acting between the magnet 72 and the magnet 76.

The bladder bag 70 is provided with the magnet 72 at a position making contact with the corner portion 29a of the first space molding portion 27a of the bladder bag main body 22, as illustrated in FIG. 11. With this configuration, the bladder bag main body 22 can be separated from the inside of the composite material 10 using, as a point of origin, the corner portion 29a of the bladder bag main body 22 that tends to be caught by the recess of the composite material 10 when the bladder bag 70 is taken out, so that the bladder bag 70 can be taken out from the inside of the composite material 10 more easily. It should be noted that the magnet 72 may be provided in another space molding portion and may be provided in the corner portion of another space molding portion, and the same holds true for these cases.

A molding method of the composite material 10 in the fifth embodiment will be described. The molding method of the composite material 10 in the fifth embodiment includes an arranging step (step S12), a molding step (step S14), and a taking step (step S16) in a similar manner to the first embodiment. At step S12 in the molding method of the composite material 10 in the fifth embodiment, the bladder bag 20 in the first embodiment is replaced by the bladder bag 70.

At Step S14 in the molding method of the composite material 10 in the fifth embodiment, processing of making the bladder bag main body 22 and the composite material 10 close to each other with the attraction force acting between the magnet 72 and the other magnet 74 having the magnetic pole differing from that of the magnet 72 by bringing the magnet 74 close to the magnet 72 from the outside of the composite material 10 is added to that in the first embodiment.

At Step S16 in the molding method of the composite material 10 in the fifth embodiment, processing of separating the bladder bag main body 22 and the composite material 10 from each other with the repulsive force acting between the magnet 72 and the other magnet 76 having the same magnetic pole as that of the magnet 72 by bringing the magnet 76 close to the magnet 72 from the outside of the composite material 10 is added to that in the first embodiment.

The molding method of the composite material 10 in the fifth embodiment has the above-mentioned configuration, and uniformity of the pressure applied to the inside of the composite material is therefore not impaired because the bladder bag main body 22 and the inside of the composite material 10 are made close to each other with the attraction force acting between the magnet 72 and the magnet 74. The molding method of the composite material 10 in the fifth embodiment enables the bladder bag 70 to be taken out from the inside of the composite material 10 more easily with the repulsive force acting between the magnet 72 and the magnet 76.

The molding method of the composite material 10 in the fifth embodiment is preferable because the magnet 72 of the bladder bag 70 is provided at the position making contact with the corner portion 29a of the first space molding portion 27a of the bladder bag main body 22. With this configuration, the molding method of the composite material 10 in the fifth embodiment enables the bladder bag main body 22 to be separated from the inside of the composite material 10 using, as the point of origin, the corner portion 29a of the bladder bag main body 22 that tends to be caught by the recess of the composite material 10 when the bladder bag 70 is taken out, so that the bladder bag 70 can be taken out from the inside of the composite material 10 more easily.

It should be noted that the magnet 72 may additionally be provided in each of the bladder bag 40, the bladder bag 50, and the bladder bag 60 instead of the bladder bag 20. Also in these cases, similar functions and effects to those obtained in the case in which the magnet 72 is additionally provided in the bladder bag 20 in the first embodiment can be provided.

The molding method of the composite material 10 that is similar to the molding method of the composite material 10 in the fifth embodiment may be implemented using the bladder bag formed by additionally providing the magnet 72 in each of the bladder bag 40, the bladder bag 50, and the bladder bag 60. Also in these cases, similar functions and effects to those obtained in the molding method of the composite material 10 using the bladder bag 70 in the fifth embodiment are provided.

Sixth Embodiment

Figure 13:
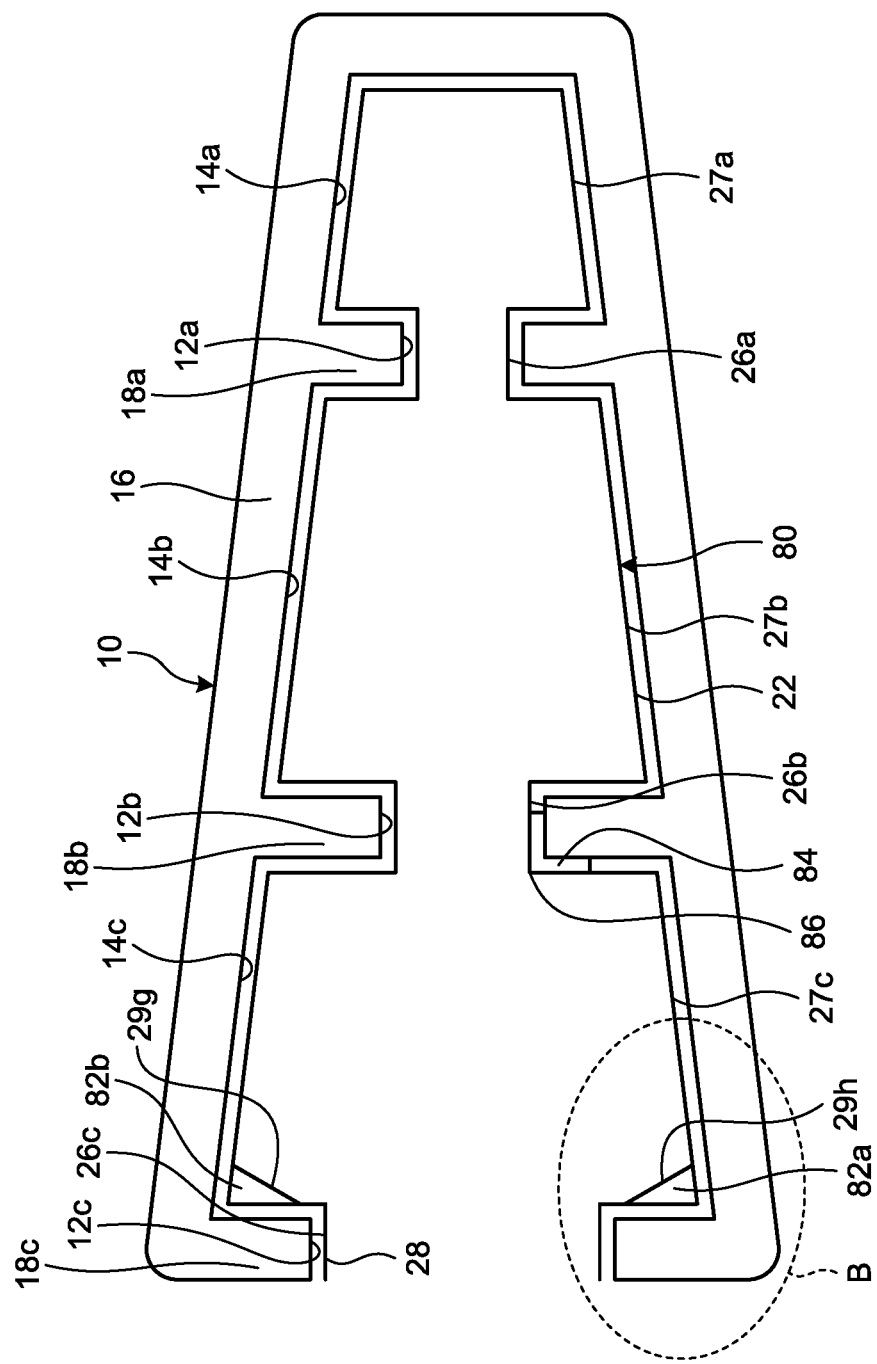
FIG. 13 is a cross-sectional view illustrating a bladder bag and one state in a molding method of a composite material according to a sixth embodiment.
Figure 14:
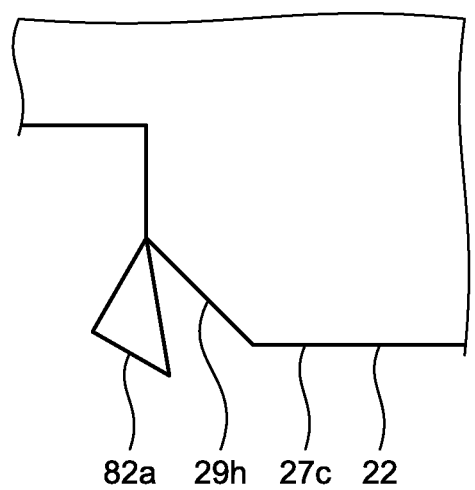
FIG. 14 is an enlarged view of a region B in FIG. 13 and is a cross-sectional view illustrating details of a part of the bladder bag and one state in the molding method of the composite material in the sixth embodiment.

FIG. 13 is a cross-sectional view illustrating a bladder bag 80 and one state in a molding method of the composite material 10 according to a sixth embodiment. FIG. 14 is an enlarged view of a region B in FIG. 13 and is a cross-sectional view illustrating details of a part of the bladder bag 80 and one state in the molding method of the composite material 10 in the sixth embodiment. The region B in FIG. 13 is a part of a region in the vicinity of the entrance of the space inside the composite material 10 and includes a part of a region of the bladder bag 80 including the corner portion 29h of the third space molding portion 27c in the vicinity of the entrance and a part of a region of the composite material 10 in the vicinity of the entrance that opposes the corner portion 29h. The bladder bag 80 molds the inside of the composite material 10 by applying pressure thereto from the inside of the composite material 10. The bladder bag 80 is formed by additionally providing a first solid member 82a, a second solid member 82b, and a third solid member 84 on the side of the outer surface of the bladder bag main body 22 in the bladder bag 20. In FIGS. 13 and 14, the wires 24 are not illustrated. In description of the sixth embodiment, the same reference numeral groups as those in the first embodiment denote similar configurations to those in the first embodiment and detailed description thereof is omitted.

The bladder bag 80 further includes the first solid member 82a, the second solid member 82b, and the third solid member 84 provided on the side of the outer surface of the bladder bag main body 22, as illustrated in FIG. 13. The first solid member 82a, the second solid member 82b, and the third solid member 84 have properties that they are resistant to heat to be applied thereto in molding the composite material 10. The first solid member 82a, the second solid member 82b, and the third solid member 84 are exemplified by a rubber-like member, clay, or water-soluble gypsum.

The first solid member 82a is provided at a place on the side of the outer surface of the third space molding portion 27c of the bladder bag main body 22 that corresponds to the corner portion 29h. The second solid member 82b is provided at a place on the side of the outer surface of the third space molding portion 27c of the bladder bag main body 22 that corresponds to the corner portion 29g. The third solid member 84 is provided on a projection 86 at a place on the side of the outer surface of a projecting region from the third space molding portion 27c to the second narrow molding portion 26b of the bladder bag main body 22.

All of the first solid member 82a, the second solid member 82b, and the third solid member 84 are provided while adhering to the side of the outer surface of the bladder bag main body 22. For example, the first solid member 82a is provided at the place on the side of the outer surface of the bladder bag main body 22 that corresponds to the corner portion 29h, as illustrated in FIG. 14. The first solid member 82a, the second solid member 82b, the third solid member 84, and an adhesive member to the bladder bag main body 22 have properties that they are resistant to heat to be applied thereto in molding the composite material 10 and are not broken even when pulled. The adhesive member is exemplified by a heat-resistant adhesive.

All of the first solid member 82a, the second solid member 82b, and the third solid member 84 on the side facing the inside of the composite material 10 are formed into shapes corresponding to the relatively sharp inner surface of the composite material 10, all of them on the side facing and adhering to the outer surface of the bladder bag main body 22 have conformed shapes to the material of the bladder bag main body 22 and are formed into gentle planar shapes, that is, smooth planar shapes without non-continuous place. To be specific, the first solid member 82a has a projecting three-dimensional shape corresponding to the shape of the recess of the composite material 10 that faces the corner portion 29h and a gentle surface corresponding to the place of the bladder bag main body 22 that includes the corner portion 29h. The second solid member 82b has a projecting three-dimensional shape corresponding to the shape of the recess of the composite material 10 that faces the corner portion 29g and a gentle surface corresponding to the place of the bladder bag main body 22 that includes the corner portion 29g. The third solid member 84 has a recessed three-dimensional shape corresponding to the projecting shape of the composite material 10 that faces the projection 86 and the gentle surface corresponding to the place of the bladder bag main body 22 that includes the projection 86.

The bladder bag 80 has the above-mentioned configuration, and can therefore preferably protect the bladder bag main body 22 from the inner surface of the composite material 10 by the first solid member 82a, the second solid member 82b, and the third solid member 84. The bladder bag 80 can preferably protect, by the first solid member 82a, the bladder bag main body 22 from the tensile force with the wire 24 connected to the corner portion 29h and protect, by the second solid member 82b, the bladder bag main body 22 from the tensile force with the wire 24 connected to the corner portion 29g.

The bladder bag 80 is provided with the first solid member 82a, the second solid member 82b, and the third solid member 84 on the side of the outer surface of the bladder bag main body 22, so that the first solid member 82a, the second solid member 82b, and the third solid member 84 can be arranged at predetermined positions on the outer surface of the bladder bag main body 22 with high accuracy. The bladder bag 80 can therefore protect the predetermined positions of the bladder bag main body 22 more reliably and preferably.

The member provided with the bladder bag 80 is not limited to the first solid member 82a, the second solid member 82b, and the third solid member 84, and a solid member may be additionally provided at another place. The bladder bag 80 may be provided with, for example, a solid member at a place corresponding to a protrusion, a projection, or a place at which the surface is non-continuous on the inner surface of the composite material 10. In this case, the bladder bag 80 can preferably protect, by the provided solid member, the bladder bag main body 22 from the protrusion, the projection, or the place at which the surface is non-continuous on the inner surface of the composite material 10.

A molding method of the composite material 10 in the sixth embodiment will be described. The molding method of the composite material 10 in the sixth embodiment includes an arranging step (step S12), a molding step (step S14), and a taking step (step S16) in a similar manner to the first embodiment. At step S12, step S14, and step S16 in the molding method of the composite material 10 in the sixth embodiment, the bladder bag 20 in the first embodiment is replaced by the bladder bag 80. At step S16 in the molding method of the composite material 10 in the sixth embodiment, the bladder bag main body 22, the first solid member 82a, the second solid member 82b, and the third solid member 84 are simultaneously taken out.

The molding method of the composite material 10 in the sixth embodiment has the above-mentioned configuration, and can therefore preferably protect the bladder bag main body 22 from the inner surface of the composite material 10 by the first solid member 82a, the second solid member 82b, and the third solid member 84. The molding method of the composite material 10 in the sixth embodiment can preferably protect, by the first solid member 82a, the bladder bag main body 22 from the tensile force with the wire 24 connected to the corner portion 29h and protect, by the second solid member 82b, the bladder bag main body 22 from the tensile force with the wire 24 connected to the corner portion 29g.

The molding method of the composite material 10 in the sixth embodiment enables the first solid member 82a, the second solid member 82b, and the third solid member 84 to be arranged at the predetermined positions on the outer surface of the bladder bag main body 22 with high accuracy because the first solid member 82a, the second solid member 82b, and the third solid member 84 are provided on the side of the outer surface of the bladder bag main body 22. The molding method of the composite material 10 in the sixth embodiment can therefore protect the predetermined positions of the bladder bag main body 22 more reliably and preferably.

With the molding method of the composite material 10 in the sixth embodiment, the bladder bag 80 may be provided with, for example, the solid member at the place corresponding to the protrusion, the projection, or the place at which the surface is non-continuous on the inner surface of the composite material 10. In this case, the molding method of the composite material 10 in the sixth embodiment can preferably protect, by the provided solid member, the bladder bag main body 22 from the protrusion, the projection, or the place at which the surface is non-continuous on the inner surface of the composite material 10.

It should be noted that the solid members including the first solid member 82a, the second solid member 82b, and the third solid member 84 may additionally be provided in each of the bladder bag 40, the bladder bag 50, the bladder bag 60, and the bladder bag 70 instead of the bladder bag 20. When the solid members are additionally provided in each of the bladder bag 60 and the bladder bag 70, the solid members may be provided on the inner side or the outer side of the deaerating circuit 52. Even in these cases, in a similar manner to the case in which the solid members are additionally provided in the bladder bag 20, the bladder bag main body 22 or the bladder bag main body 42 can be preferably protected from the inner surface of the composite material 10 by the solid members including the first solid member 82a, the second solid member 82b, and the third solid member 84.

In the case in which these solid members are additionally provided in the bladder bag 40, when the solid members and the wires 44 are provided at the same places, the bladder bag main body 42 can be preferably protected from the tensile force with the wires 44 by the solid members in a similar manner to the case in which the solid members are additionally provided in the bladder bag 20. In the case in which these solid members are additionally provided in the bladder bag 60, when any of the solid members and the string 62 are provided at the same places, the bladder bag main body 22 can be preferably protected from the tensile force with the string 62 by the solid member.

A molding method of the composite material 10 that is similar to the molding method of the composite material 10 in the sixth embodiment may be implemented using the bladder bag formed by additionally providing the solid members including the first solid member 82a, the second solid member 82b, and the third solid member 84 in each of the bladder bag 40, the bladder bag 50, the bladder bag 60, and the bladder bag 70. Even in these cases, in a similar manner to the molding method of the composite material 10 using the bladder bag 80 in the sixth embodiment, the bladder bag main body 22 or the bladder bag main body 42 can be preferably protected from the inner surface of the composite material 10 by the solid members including the first solid member 82a, the second solid member 82b, and the third solid member 84.

The molding method of the composite material 10 that is similar to the molding method of the composite material 10 in the sixth embodiment may be implemented using the bladder bag 40 formed by providing these solid members additionally at the same places as the wires 44. In this case, the bladder bag main body 42 can be preferably protected from the tensile force with the wires 44 by the solid members in a similar manner to the case in which the solid members are additionally provided in the bladder bag 20. The molding method of the composite material 10 that is similar to the molding method of the composite material 10 in the sixth embodiment may be implemented using the bladder bag 60 formed by providing any of these solid members additionally at the same place as the string 62. In this case, the bladder bag main body 22 can be preferably protected from the tensile force with the string 62 by the solid members.

Seventh Embodiment

Figure 15:
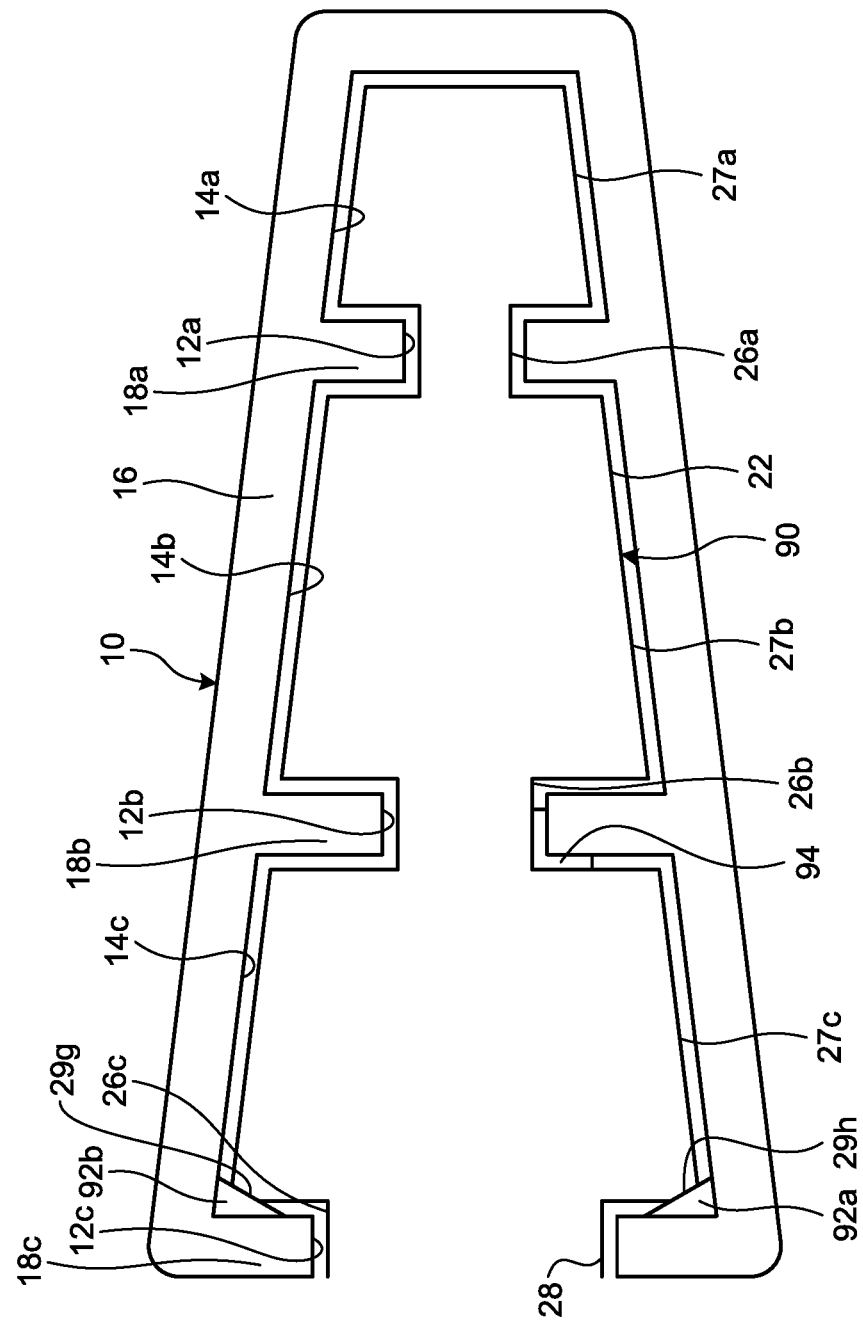
FIG. 15 is a cross-sectional view illustrating a bladder bag and one state in a molding method of a composite material according to a seventh embodiment.

FIG. 15 is a cross-sectional view illustrating a bladder bag 90 and one state in a molding method of the composite material 10 according to a seventh embodiment. The bladder bag 90 molds the inside of the composite material 10 by applying pressure thereto from the inside of the composite material 10. The bladder bag 90 is formed by additionally providing a first solid member 92*a*, a second solid member 92*b*, and a third solid member 94 on the side of the outer surface of the bladder bag main body 22 in the bladder bag 20. In FIG. 15, the wires 24 are not illustrated. In description of the seventh embodiment, the same reference numeral groups as those in the first embodiment denote similar configurations to those in the first embodiment and detailed description thereof is omitted.

The bladder bag 90 further includes the first solid member 92*a*, the second solid member 92*b*, and the third solid member 94 provided on the side of the outer surface of the bladder bag main body 22, as illustrated in FIG. 15. All of the first solid member 92*a*, the second solid member 92*b*, and the third solid member 94 have similar properties to those of the first solid member 82*a*, the second solid member 82*b*, and the third solid member 84 in the sixth embodiment, and are made of a similar material.

The first solid member 92*a* is provided at a similar position to that of the first solid member 82*a* and has a similar shape to that of the first solid member 82*a*. The second solid member 92*b* is provided at a similar position to that of the second solid member 82*b* and has a similar shape to that of the second solid member 82*b*. The third solid member 94 is provided at a similar position to that of the third solid member 84 and has a similar shape to that of the third solid member 84.

All of the first solid member 92*a*, the second solid member 92*b*, and the third solid member 94 are provided while firmly adhering to the inner surface of the composite material 10. The first solid member 92*a*, the second solid member 92*b*, and the third solid member 94 are made into states of making contact with the outer surface of the bladder bag main body 22. The first solid member 92*a*, the second solid member 92*b*, and the third solid member 94 may firmly adhere to the inner surface of the composite material 10 using properties of a used material or may adhere thereto using an adhesive member. The adhesive member has properties that it is resistant to heat to be applied thereto in molding the composite material 10. The adhesive member is exemplified by a heat-resistant adhesive.

The bladder bag 90 has the above-mentioned configuration, and the bladder bag main body 22 can therefore be preferably protected from the inner surface of the composite material 10 by the first solid member 92*a*, the second solid member 92*b*, and the third solid member 94. The bladder bag 90 can preferably protect the bladder bag main body 22 from the tensile force with the wire 24 connected to the corner portion 29*h* because the first solid member 92*a* forms the vicinity of the corner portion 29*h* of the bladder bag main body 22 into a planar shape with gentler irregularities. The bladder bag 90 can preferably protect the bladder bag main body 22 from the tensile force with the wire 24 connected to the corner portion 29*g* because the second solid member 92*b* forms the vicinity of the corner portion 29*g* of the bladder bag main body 22 into a planar shape with gentler irregularities.

The bladder bag 90 is provided with the first solid member 92*a*, the second solid member 92*b*, and the third solid member 94 on the side of the inner surface of the composite material 10, so that the first solid member 92*a*, the second solid member 92*b*, and the third solid member 94 can be arranged at predetermined positions on the inner surface of the composite material 10 with high accuracy. With this configuration, the bladder bag 90 can preferably protect the bladder bag main body 22 from the inner surface of the composite material 10 more reliably.

The member provided with the bladder bag 90 is not limited to the first solid member 92*a*, the second solid member 92*b*, and the third solid member 94, and a solid member may additionally be provided at another place. The bladder bag 90 may be provided with, for example, a solid member at a place corresponding to a protrusion, a projection, or a place at which the surface is non-continuous on the inner surface of the composite material 10. In this case, the bladder bag 90 can preferably protect, by the provided solid member, the bladder bag main body 22 from the protrusion, the projection, or the place at which the surface is non-continuous on the inner surface of the composite material 10.

A molding method of the composite material 10 in the seventh embodiment will be described. The molding method of the composite material 10 in the seventh embodiment includes an arranging step (step S12), a molding step (step S14), and a taking step (step S16) in a similar manner to the first embodiment. At step S12, step S14, and step S16 in the molding method of the composite material 10 in the seventh embodiment, the bladder bag 20 in the first embodiment is replaced by the bladder bag 90.

At step S12 in the molding method of the composite material 10 in the seventh embodiment, first, the first solid member 92*a*, the second solid member 92*b*, and the third solid member 94 are arranged and are made to firmly adhere at predetermined positions inside the composite material 10. The first solid member 92*a*, the second solid member 92*b*, and the third solid member 94 may firmly adhere thereto using the properties of the used material or may adhere thereto using the adhesive member. After firm adhesion of the first solid member 92*a*, the second solid member 92*b*, and the third solid member 94, a portion of the bladder bag 90 including the bladder bag main body 22 other than the first solid member 92*a*, the second solid member 92*b*, and the third solid member 94, that is, a portion corresponding to the bladder bag 20 is inserted from the entrance of the inside of the composite material 10 and is arranged inside the composite material 10.

At step S16 in the molding method of the composite material 10 in the seventh embodiment, first, the portion of the bladder bag 90 including the bladder bag main body 22 other than the first solid member 92*a*, the second solid member 92*b*, and the third solid member 94, that is, the portion corresponding to the bladder bag 20 is taken out from the entrance of the inside of the composite material 10. Thereafter, the first solid member 92*a*, the second solid member 92*b*, and the third solid member 94 are removed. The first solid member 92*a*, the second solid member 92*b*, and the third solid member 94 may be removed by physically taking out the first solid member 92*a*, the second solid member 92*b*, and the third solid member 94 or dissolving the first solid member 92*a*, the second solid member 92*b*, and the third solid member 94 in a solvent. As a method for removing the first solid member 92a, the second solid member 92b, and the third solid member 94 by dissolving them in the solvent, for example, water-soluble gypsum is used for the first solid member 92a, the second solid member 92b, and the third solid member 94 and is dissolved in water for removal.

The molding method of the composite material 10 in the seventh embodiment has the above-mentioned configuration, and can preferably protect the bladder bag main body 22 from the inner surface of the composite material 10 by the first solid member 92a, the second solid member 92b, and the third solid member 94. The molding method of the composite material 10 in the seventh embodiment can preferably protect the bladder bag main body 22 from the tensile force with the wire 24 connected to the corner portion 29h because the first solid member 92a forms the vicinity of the corner portion 29h of the bladder bag main body 22 into the planar shape with the gentler irregularities. The molding method of the composite material 10 in the seventh embodiment can preferably protect the bladder bag main body 22 from the tensile force with the wire 24 connected to the corner portion 29g because the second solid member 92b forms the vicinity of the corner portion 29g of the bladder bag main body 22 into the planar shape with the gentler irregularities.

The molding method of the composite material 10 in the seventh embodiment enables the first solid member 92a, the second solid member 92b, and the third solid member 94 to be arranged at the predetermined positions on the inner surface of the composite material 10 with high accuracy because the first solid member 92a, the second solid member 92b, and the third solid member 94 are provided on the side of the inner surface of the composite material 10. With this configuration, the molding method of the composite material 10 in the seventh embodiment enables the bladder bag main body 22 to be preferably protected from the inner surface of the composite material 10 more reliably.

With the molding method of the composite material 10 in the seventh embodiment, the bladder bag 90 may be provided with, for example, the solid member at the place corresponding to the protrusion, the projection, or the place at which the surface is non-continuous on the inner surface of the composite material 10. In this case, the molding method of the composite material 10 in the seventh embodiment can preferably protect, by the provided solid member, the bladder bag main body 22 from the protrusion, the projection, or the place at which the surface is non-continuous on the inner surface of the composite material 10.

It should be noted that the solid members including the first solid member 92a, the second solid member 92b, and the third solid member 94 may additionally be provided in each of the bladder bag 40, the bladder bag 50, the bladder bag 60, and the bladder bag 70 instead of the bladder bag 20. When the solid members are additionally provided in each of the bladder bag 60 and the bladder bag 70, the solid members are provided on the outer side of the deaerating circuit 52. Even in these cases, in a similar manner to the case in which these solid members are additionally provided in the bladder bag 20, the solid members including the first solid member 92a, the second solid member 92b, and the third solid member 94 can preferably protect the bladder bag main body 22 or the bladder bag main body 42 from the inner surface of the composite material 10 more reliably.

In the case in which these solid members are additionally provided in the bladder bag 40, when the solid members and the wires 44 are provided at the same places, the bladder bag main body 42 can be preferably protected from the tensile force with the wires 44 because the solid members form the vicinities of the wires 44 into planar shapes with gentler irregularities in a similar manner to the case in which the solid members are additionally provided in the bladder bag 20. In the case in which these solid members are additionally provided in the bladder bag 60, when any of the solid members and the string 62 are provided at the same places, the bladder bag main body 22 can be preferably protected from the tensile force with the string 62 because the solid member forms the vicinity of the string 62 into a planar shape with gentler irregularities.

A molding method of the composite material 10 that is similar to the molding method of the composite material 10 in the seventh embodiment may be implemented using the bladder bag formed by additionally providing the solid members including the first solid member 92a, the second solid member 92b, and the third solid member 94 in each of the bladder bag 40, the bladder bag 50, the bladder bag 60, and the bladder bag 70. Even in these cases, in a similar manner to the molding method of the composite material 10 using the bladder bag 90 in the seventh embodiment, the bladder bag main body 22 or the bladder bag main body 42 can be preferably protected from the inner surface of the composite material 10 by the solid members including the first solid member 92a, the second solid member 92b, and the third solid member 94.

The molding method of the composite material 10 that is similar to the molding method of the composite material 10 in the seventh embodiment may be implemented using the bladder bag 40 formed by providing these solid members additionally at the same places as the wires 44. In this case, the bladder bag main body 42 can be preferably protected from the tensile force with the wires 44 because the solid members form the vicinities of the wires 44 into the planar shapes with the gentler irregularities in a similar manner to the case in which the solid members are additionally provided in the bladder bag 20. The molding method of the composite material 10 that is similar to the molding method of the composite material 10 in the seventh embodiment may be implemented using the bladder bag 60 formed by providing any of these solid members additionally at the same place as the string 62. In this case, the bladder bag main body 22 can preferably be protected from the tensile force with the string 62 because the solid members form the vicinity of the string 62 into the planar shape with the gentler irregularities.

A first group of the solid members including the first solid member 82a, the second solid member 82b, and the third solid member 84 that are provided while adhering to the side of the outer surface of the bladder bag main body 22 or the bladder bag main body 42 in the sixth embodiment and a second group of the solid members including the first solid member 92a, the second solid member 92b, and the third solid member 94 that are provided while firmly adhering to the side of the inner surface of the composite material 10 in the seventh embodiment may be used in combination. In this case, preferably, the first group of the solid members are used at places at which positional accuracy of the solid members on the side of the outer surface of the bladder bag main body 22 or the bladder bag main body 42 is desired to be increased and the second group of the solid members are used at places at which positional accuracy of the solid members on the side of the inner surface of the composite material 10 is desired to be increased.

Eighth Embodiment

Figure 16:
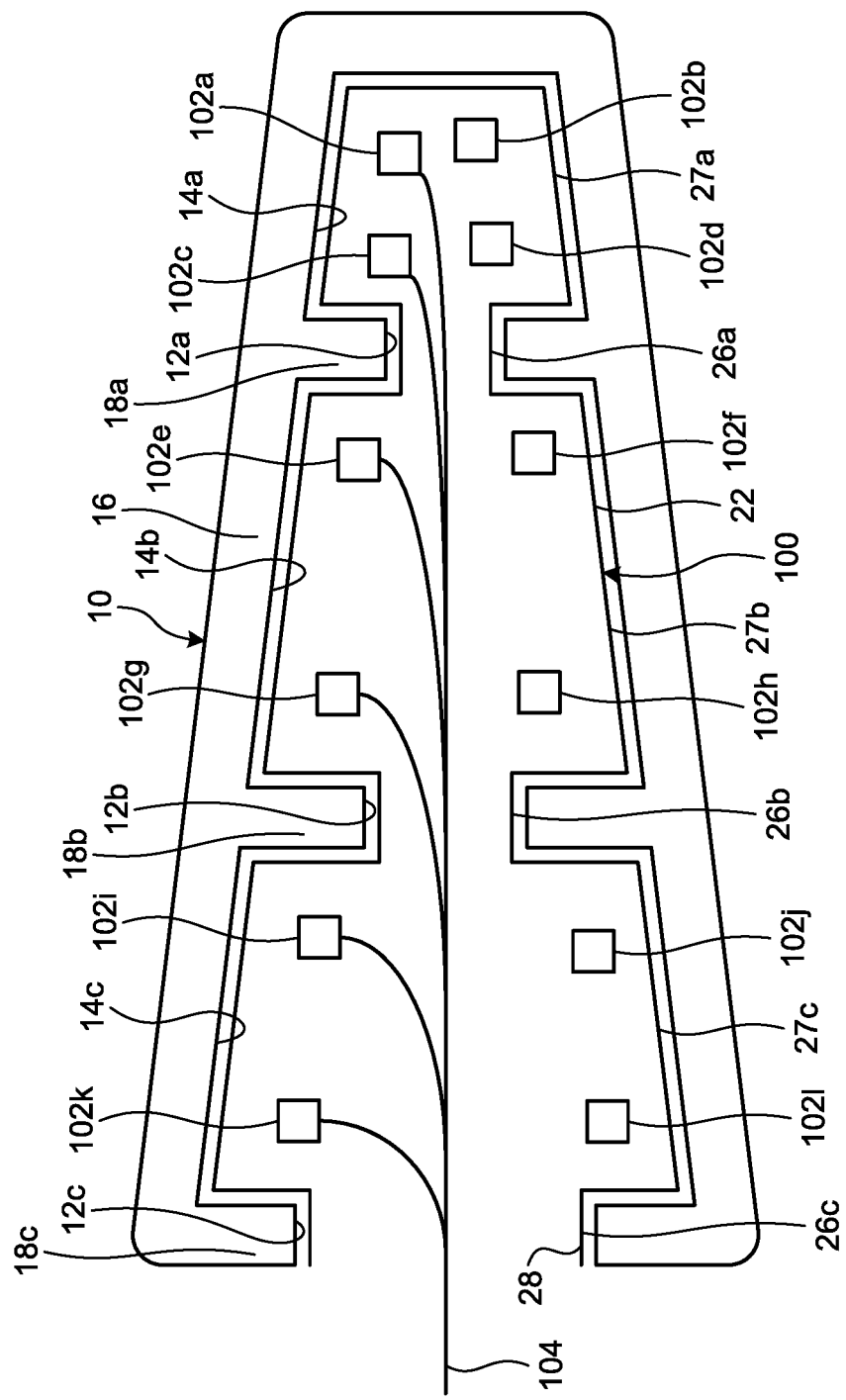
FIG. 16 is a cross-sectional view illustrating a bladder bag and one state in a molding method of a composite material according to an eighth embodiment.

FIG. 16 is a cross-sectional view illustrating a bladder bag 100 and one state in a molding method of the composite material 10 according to an eighth embodiment. The bladder bag 100 molds the inside of the composite material 10 by applying pressure thereto from the inside of the composite material 10. The bladder bag 100 is formed by additionally providing, in the bladder bag 20, a sensor 102a, a sensor 102b, a sensor 102c, a sensor 102d, a sensor 102e, a sensor 102f, a sensor 102g, a sensor 102h, a sensor 102i, a sensor 102j, a sensor 102k, and a sensor 102l on the side of the inner surface of the bladder bag main body 22, and wirings 104 connected to the sensor 102a to the sensor 102l from the air intake 28. In FIG. 16, the wires 24 are not illustrated. In FIG. 16, the half of the wirings 104 are not illustrated. In description of the eighth embodiment, the same reference numeral groups as those in the first embodiment denote similar configurations to those in the first embodiment and detailed description thereof is omitted.

As illustrated in FIG. 16, the bladder bag 100 includes the sensor 102a to the sensor 102l as a plurality of sensors provided on the side of the inner surface of the bladder bag main body 22 and the wirings 104 connected from the air intake 28 to the sensor 102a to the sensor 102l as the sensors. All of the sensor 102a to the sensor 102l measure physical amounts of the inside of the composite material 10. Examples of the physical amounts that the sensor 102a to the sensor 102l measure include a temperature and an air pressure. That is to say, the sensor 102a to the sensor 102l are, for example, temperature sensors and air pressure sensors. The wirings 104 can transfer electricity and information and have properties that they are resistant to heat to be applied thereto in molding the composite material 10. The wirings 104 are, for example, conducting wires made of metal. In the embodiment, the sensor 102a to the sensor 102l and the wirings 104 capable of wired information communication are used. The embodiment is not, however, limited thereto, and sensors capable of wireless information communication may be used instead of the sensor 102a to the sensor 102l and the wirings 104.

The bladder bag 100 includes the sensor 102a to the sensor 102l in the bladder bag main body 22 in a distributed manner. To be specific, as illustrated in FIG. 16, the bladder bag 100 includes the sensor 102a and the sensor 102b on the deep side in the first space molding portion 27a, the sensor 102c and the sensor 102d on the entrance side in the first space molding portion 27a, the sensor 102e and the sensor 102f on the deep side in the second space molding portion 27b, the sensor 102g and the sensor 102h on the entrance side in the second space molding portion 27b, the sensor 102i and the sensor 102j on the deep side in the third space molding portion 27c, and the sensor 102k and the sensor 102l on the entrance side in the third space molding portion 27c. The sensor 102a and the sensor 102b measure the physical amounts on the deep side in the first space molding portion 27a. The sensor 102c and the sensor 102d measure the physical amounts on the entrance side in the first space molding portion 27a. The sensor 102e and the sensor 102f measure the physical amounts on the deep side in the second space molding portion 27b. The sensor 102g and the sensor 102h measure the physical amounts on the entrance side in the second space molding portion 27b. The sensor 102i and the sensor 102j measure the physical amounts on the deep side in the third space molding portion 27c. The sensor 102k and the sensor 102l measure the physical amounts on the entrance side in the third space molding portion 27c.

A controller controlling the sensor 102a to the sensor 102l takes in pieces of information about the physical amounts measured by the sensor 102a to the sensor 102l via the wirings 104 to which the sensor 102a to the sensor 102l are connected. The controller can control the pressure of the air that is introduced into the bladder bag main body 22 and control the temperature with which the composite material 10 is heated based on the pieces of information about the physical amounts measured by the sensor 102a to the sensor 102l.

The bladder bag 100 has the above-mentioned configuration, and can therefore measure and control molding conditions of the composite material 10 in the bladder bag 100. The bladder bag 100 includes the sensor 102a to the sensor 102l in the bladder bag main body 22 in the distributed manner, so that the molding conditions of the composite material 10 in the bladder bag 100 can therefore be measured and controlled with high accuracy.

It should be noted that the bladder bag 100 may include the sensor 102a to the sensor 102l at desired places. It is preferable that the bladder bag 100 include the sensor 102a to the sensor 102l at places necessary for guaranteeing the quality of the composite material 10. In this case, the bladder bag 100 can preferably guarantee the quality of the composite material 10 that is molded.

The bladder bag 100 may be provided such that some or all of the wirings 104 incorporate with the wires 24. In this case, the bladder bag 100 has the simplified configuration in the bladder bag main body 22. That is to say, even when the sensor 102a to the sensor 102l are provided in the bladder bag 100, the configuration in the bladder bag main body 22 is not complicated. In this case, the bladder bag 100 is easily handled and the cost for one bladder bag 100 can be reduced.

A molding method of the composite material 10 in the eighth embodiment will be described. The molding method of the composite material 10 in the eighth embodiment includes an arranging step (step S12), a molding step (step S14), and a taking step (step S16) in a similar manner to the first embodiment. At step S12, step S14, and step S16 in the molding method of the composite material 10 in the eighth embodiment, the bladder bag 20 in the first embodiment is replaced by the bladder bag 100.

At step S14 in the molding method of the composite material 10 in the eighth embodiment, the sensor 102a to the sensor 102l measure the air pressure and the temperature in the bladder bag main body 22 when the composite material 10 is heated in a state in which the bladder bag main body 22 that has expanded with the air applies pressure to the inside of the composite material 10. The controller controls the molding conditions of the composite material by taking in, via the wirings 104, the pieces of information about the air pressures and the temperatures measured by the sensor 102a to the sensor 102l, and controlling the pressure of the air that is introduced into the bladder bag main body 22 and controlling the temperature at which the composite material 10 is heated based on the pieces of information about the air pressures and the temperatures.

The molding method of the composite material 10 in the eighth embodiment has the above-mentioned configuration and can therefore measure and control the molding conditions of the composite material 10 in the bladder bag 100. The bladder bag 100 includes the sensor 102a to the sensor 102l in the bladder bag main body 22 in the distributed manner, so that the molding conditions of the composite material 10 in the bladder bag 100 can therefore be measured and controlled with high accuracy.

With the molding method of the composite material 10 in the eighth embodiment, the sensor 102a to the sensor 102l of the bladder bag 100 may be provided at desired places. With the molding method of the composite material 10 in the eighth embodiment, it is preferable that the sensor 102a to the sensor 102*l* of the bladder bag 100 be provided at the places necessary for guaranteeing the quality of the composite material 10. In this case, the molding method of the composite material 10 in the eighth embodiment can preferably guarantee the quality of the composite material 10 that is molded.

With the molding method of the composite material 10 in the eighth embodiment, some or all of the wirings 104 of the bladder bag 100 may be provided so as to integrate with the wires 24. In this case, with the molding method of the composite material 10 in the eighth embodiment, the configuration in the bladder bag main body 22 of the bladder bag 100 is simplified, that is, the configuration in the bladder bag main body 22 is not complicated even when the sensor 102*a* to the sensor 102*l* are provided in the bladder bag 100. Accordingly, the method enables the bladder bag 100 to be easily handled and can decrease the cost for one bladder bag 100.

It should be noted that the sensor 102*a* to the sensor 102*l* and the wirings 104 may additionally be provided in each of the bladder bag 40, the bladder bag 50, the bladder bag 60, the bladder bag 70, and the bladder bag 80, and the bladder bag 90 instead of the bladder bag 20. Also in these cases, the molding conditions of the composite material 10 in the bladder bag can therefore be measured and controlled with high accuracy in a similar manner to the case of the bladder bag 100 formed by additionally providing the sensor 102*a* to the sensor 102*l* and the wirings 104 in the bladder bag 20.

Also when the sensor 102*a* to the sensor 102*l* and the wirings 104 are additionally provided in each of the bladder bag 40, the bladder bag 50, the bladder bag 60, the bladder bag 70, the bladder bag 80, and the bladder bag 90, the sensor 102*a* to the sensor 102*l* may be provided at desired places and it is preferable that the sensor 102*a* to the sensor 102*l* be provided at places necessary for guaranteeing the quality of the composite material 10 in a similar manner to the case of the bladder bag 100. In this case, the bladder bag can preferably guarantee the quality of the composite material 10 that is molded.

When the sensor 102*a* to the sensor 102*l* and the wirings 104 are additionally provided in the bladder bag 40, some or all of the wirings 104 may be provided so as to integrate with the wires 44 in a similar manner to the case of the bladder bag 100. In this case, the bladder bag has the simplified configuration in the bladder bag main body 42. That is to say, even when the sensor 102*a* to the sensor 102*l* are provided in the bladder bag, the configuration in the bladder bag main body 42 is not complicated. In this case, the bladder bag is easily handled and the cost for one bladder bag can be reduced.

The molding method of the composite material 10 that is similar to the molding method of the composite material 10 in the eighth embodiment may be implemented using the bladder bag formed by additionally providing the sensor 102*a* to the sensor 102*l* and the wirings 104 in each of the bladder bag 40, the bladder bag 50, the bladder bag 60, the bladder bag 70, the bladder bag 80, and the bladder bag 90. Also in these cases, the molding conditions of the composite material 10 in the bladder bag can be measured and controlled with high accuracy in a similar manner to the molding method of the composite material 10 using the bladder bag 100 in the eighth embodiment. In these methods for molding the composite material 10 that are similar to the molding method of the composite material 10 in the eighth embodiment, the sensor 102*a* to the sensor 102*l* and the wirings 104 may be provided at desired places and it is preferable that the sensor 102*a* to the sensor 102*l* be provided at places necessary for guaranteeing the quality of the composite material 10. In this case, the bladder bag can preferably guarantee the quality of the composite material 10 that is molded.

The molding method of the composite material 10 that is similar to the molding method of the composite material 10 in the eighth embodiment may be implemented using the bladder bag formed by additionally providing the sensor 102*a* to the sensor 102*l* and the wirings 104 in the bladder bag 40 and integrating some all of the wirings 104 with the wires 44. In this case, with the molding method of the composite material 10, the configuration in the bladder bag main body 42 of the bladder bag is simplified, that is, the configuration in the bladder bag main body 42 of the bladder bag is not complicated even when the sensor 102*a* to the sensor 102*l* are provided. Accordingly, the bladder bag is easily handled and the cost for one bladder bag can be reduced.

Ninth Embodiment

Figure 17:
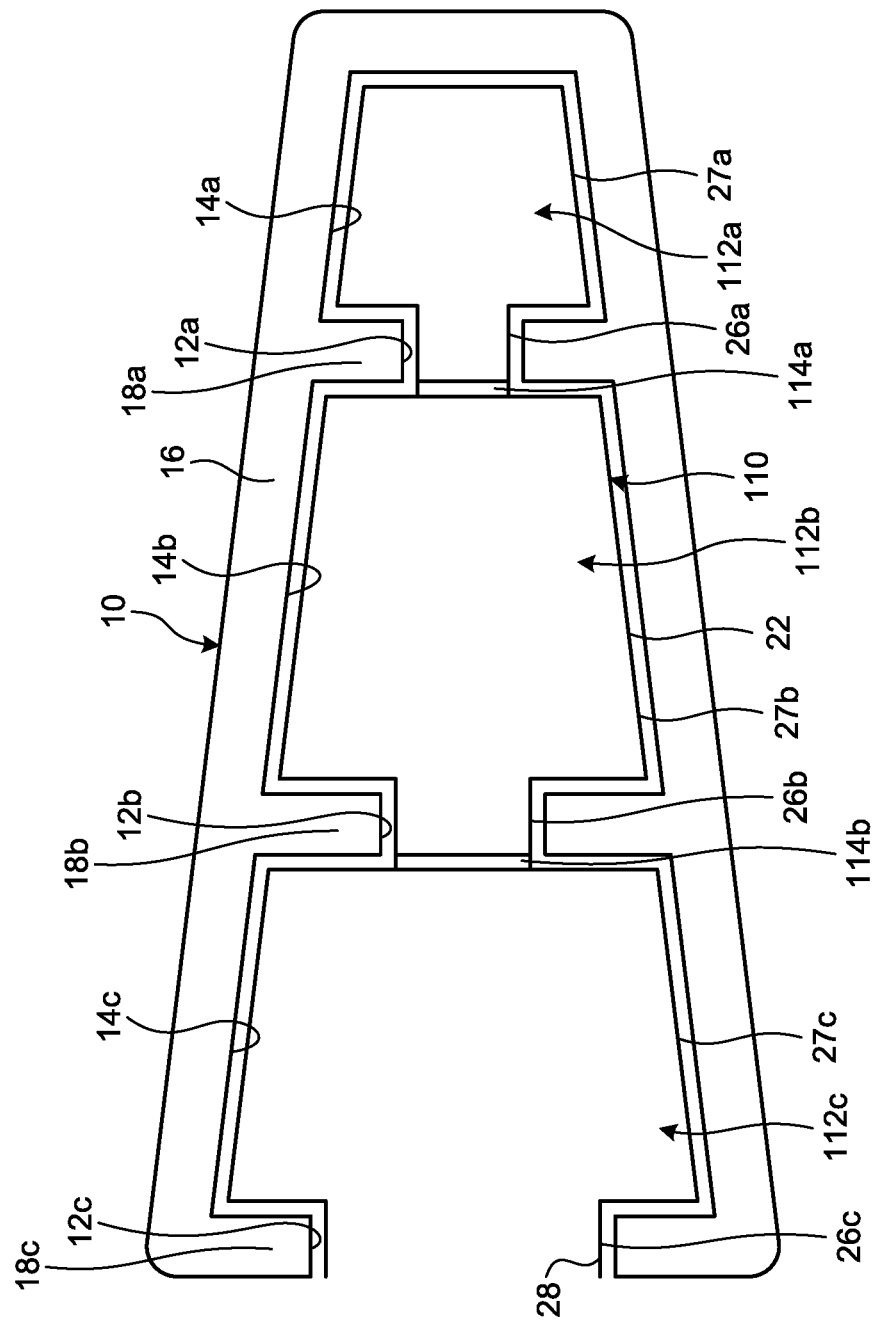
FIG. 17 is a cross-sectional view illustrating a bladder bag and one state in a molding method of a composite material according to a ninth embodiment.
Figure 18:
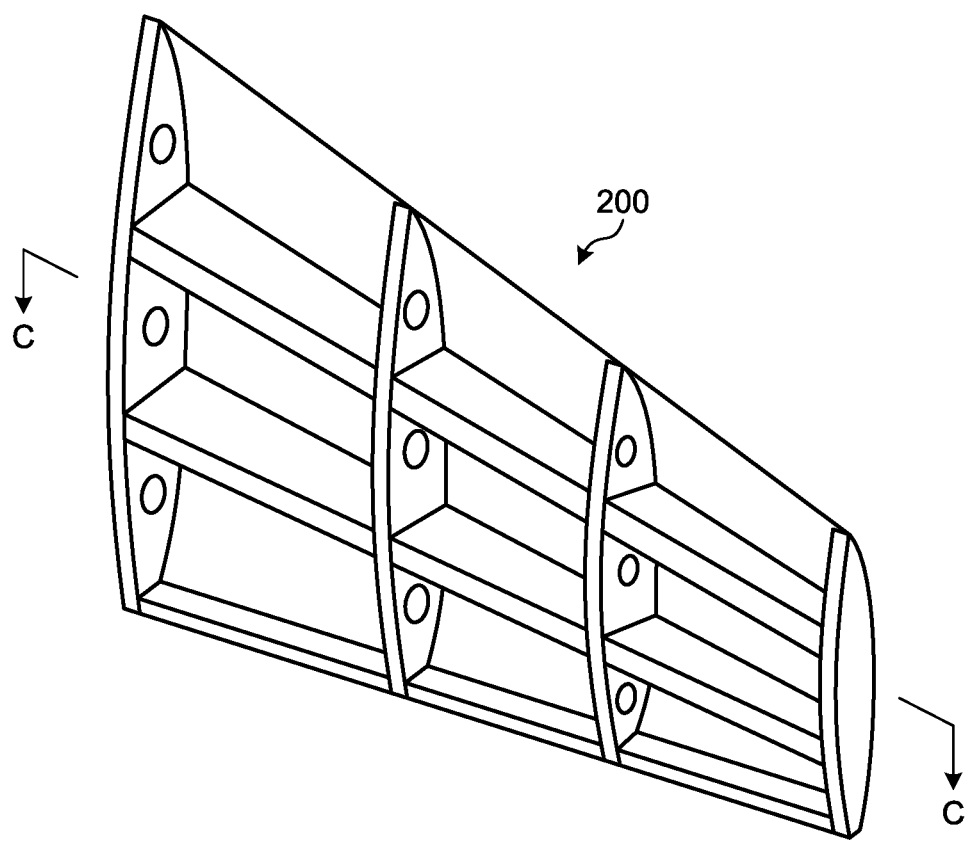
FIG. 18 is a schematic view of a composite material structure.
Figure 19:
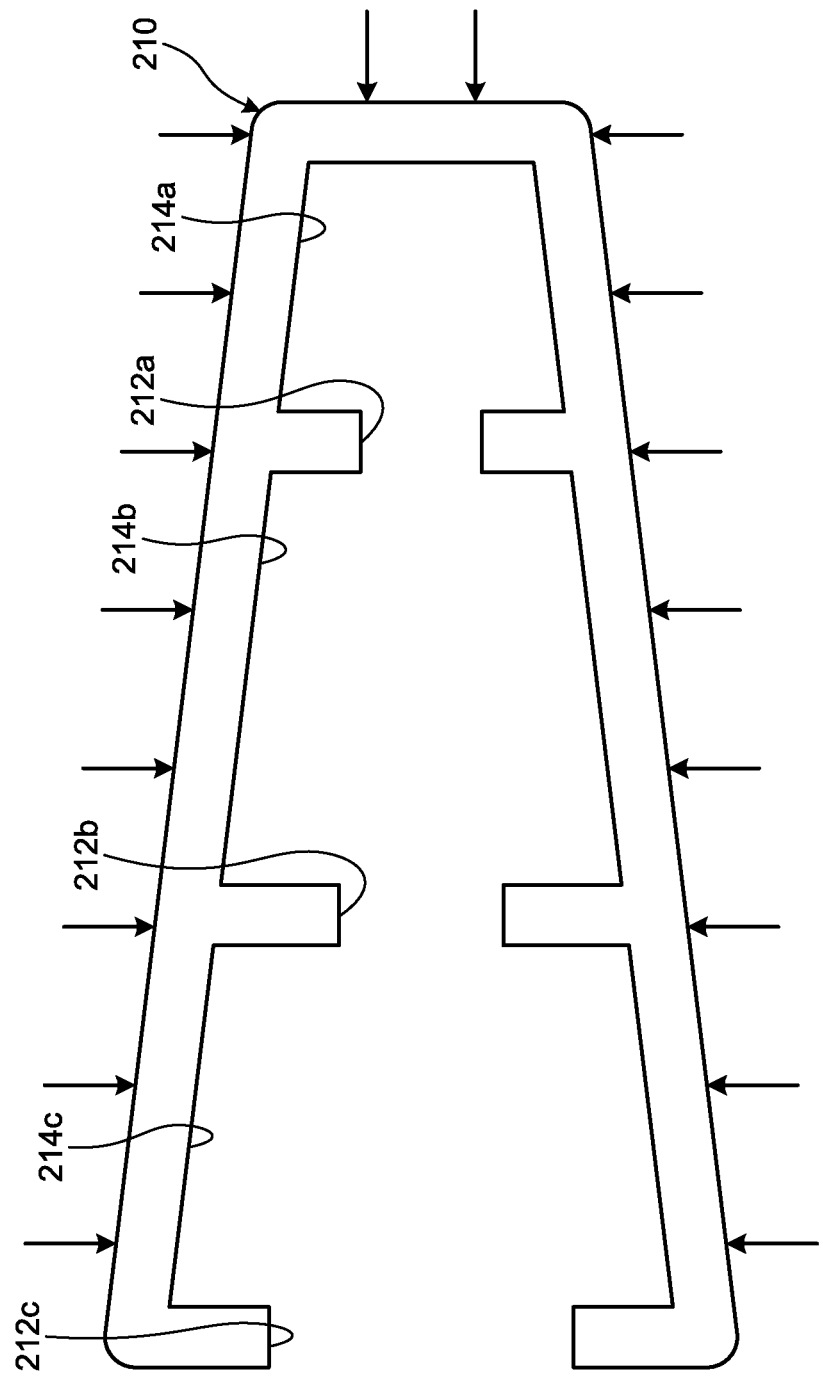
FIG. 19 is a schematic cross-sectional view of a conventional composite material structure.
Figure 20:
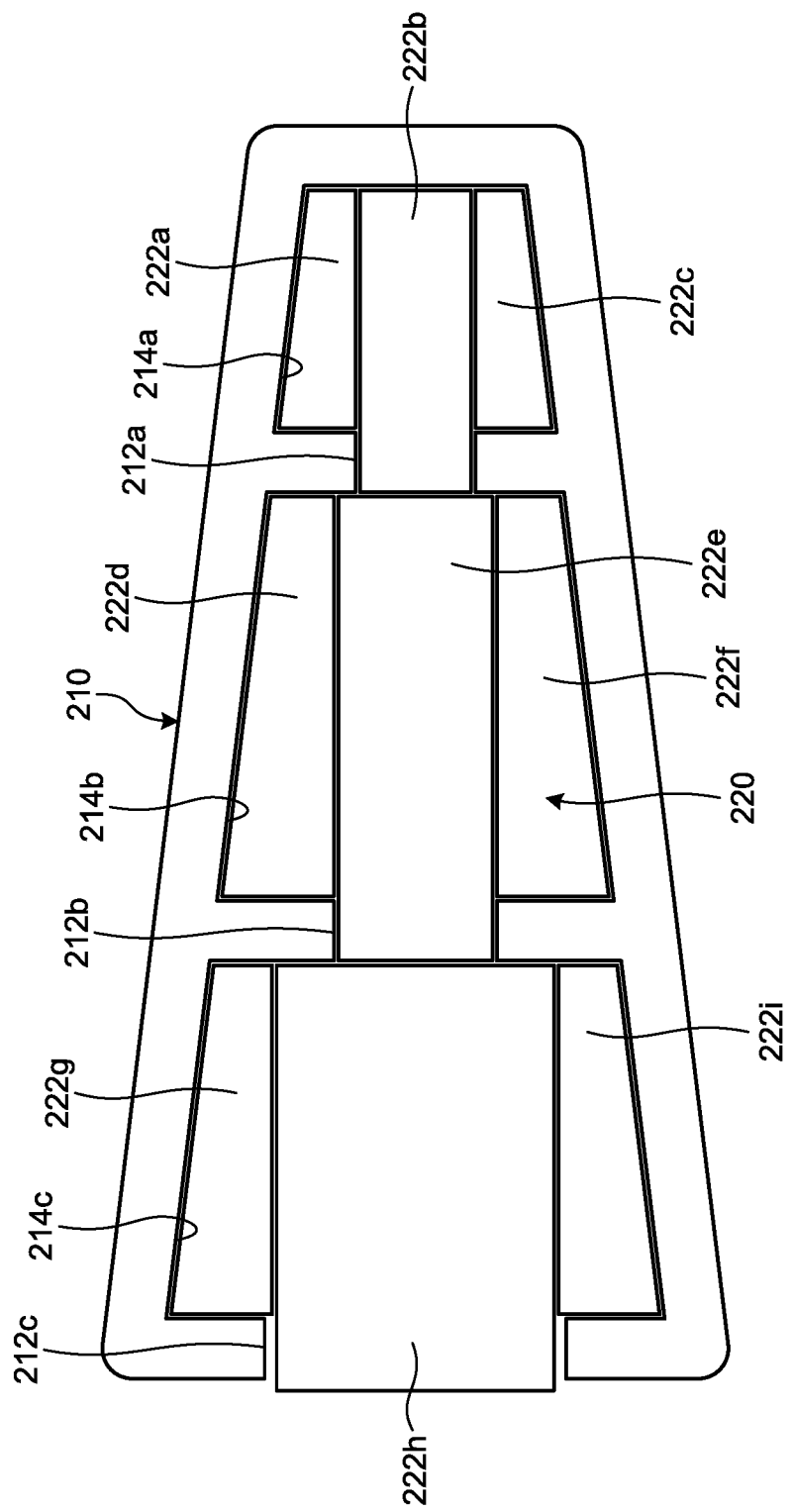
FIG. 20 is a schematic cross-sectional view illustrating a conventional mold and an example of one state in a molding method of the conventional composite material structure.
Figure 21:
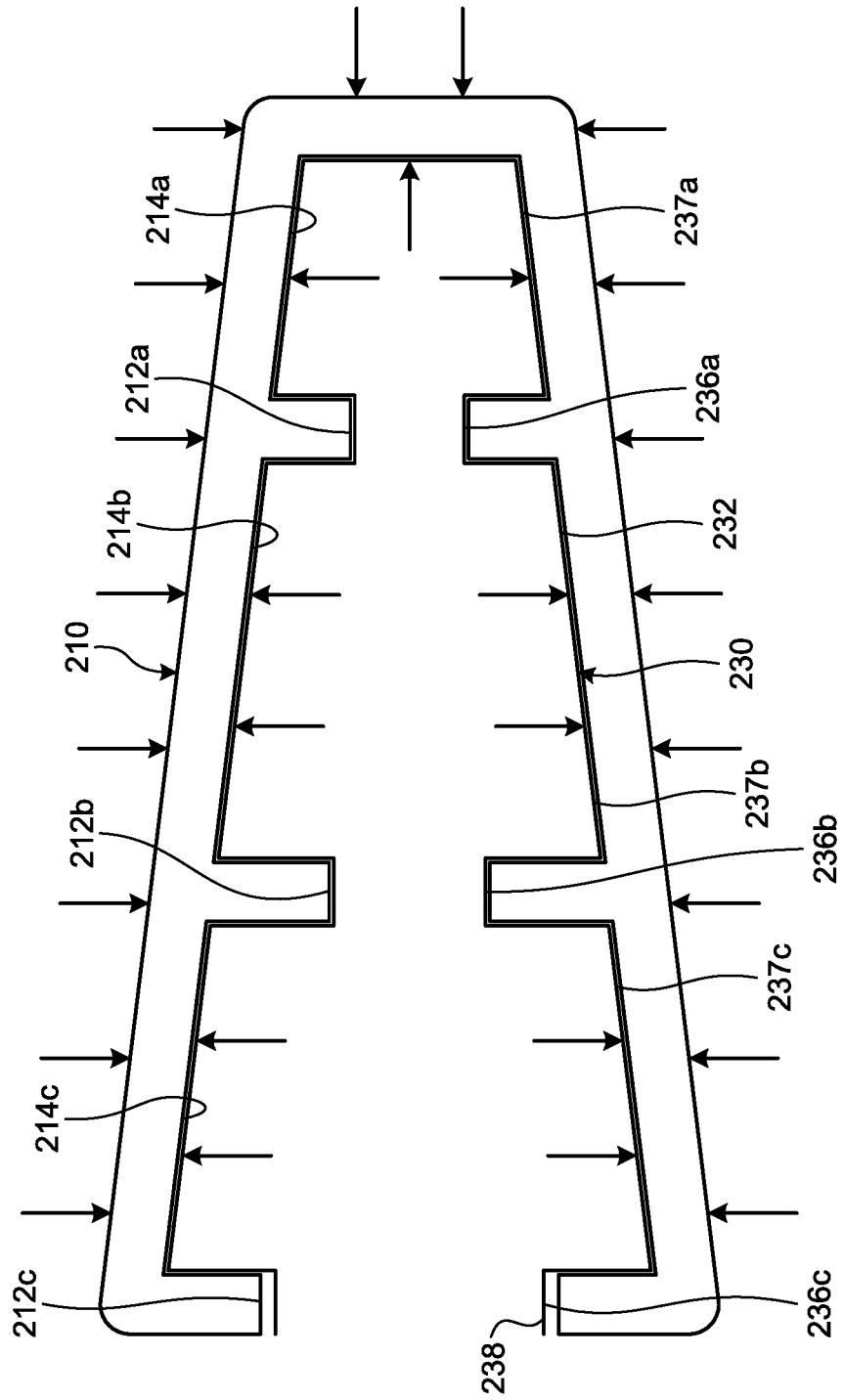
FIG. 21 is a schematic cross-sectional view illustrating a conventional bladder bag and another example of one state in the molding method of the conventional composite material structure.

FIG. 17 is a cross-sectional view illustrating a bladder bag 110 and one state in a molding method of the composite material 10 according to a ninth embodiment. The bladder bag 110 molds the inside of the composite material 10 by applying pressure thereto from the inside of the composite material 10. The bladder bag 110 is formed by additionally providing a first connection portion 114*a* and a second connection portion 114*b* by which the first narrow molding portion 26*a* and the second narrow molding portion 26*b* are capable of being connected to and separated from the bladder bag main body 22 in the bladder bag 20. In FIG. 17, the wires 24 are not illustrated. In description of the ninth embodiment, the same reference numeral groups as those in the first embodiment denote similar configurations to those in the first embodiment and detailed description thereof is omitted.

As illustrated in FIG. 17, the bladder bag main body 22 included in the bladder bag 110 includes, in the first narrow molding portion 26*a*, the first connection portion 114*a* by which the first narrow molding portion 26*a* is capable of being mechanically connected to and separated from the bladder bag main body 22 and includes, in the second narrow molding portion 26*b*, the second connection portion 114*b* by which the second narrow molding portion 26*b* is capable of being mechanically connected to and separated from the bladder bag main body 22. The bladder bag main body 22 is separated by the first connection portion 114*a* and the second connection portion 114*b* so as to be divided into a first bladder bag part body 112*a*, a second bladder bag part body 112*b*, and a third bladder bag part body 112*c*.

The first bladder bag part body 112*a* includes one side of the first connection portion 114*a* and a portion including the first narrow molding portion 26*a* on the deep side relative to the first narrow molding portion 26*a*, that is, the first narrow molding portion 26*a*, the first space molding portion 27*a*, and the wires 24 connected to the first space molding portion 27*a*. The second bladder bag part body 112*b* includes the other side of the first connection portion 114*a*, one side of the second connection portion 114*b*, and a portion including the second narrow molding portion 26*b* on the entrance side relative to the first narrow molding portion 26*a* and on the deep side relative to the second narrow molding portion 26*b*, that is, the second narrow molding portion 26*b*, the second space molding portion 27*b*, and the wires 24 connected to the second space molding portion 27*b*. The third bladder bag part body 112*c* includes the other side of the second connection portion 114b and a portion including the third narrow molding portion 26c on the entrance side relative to the second narrow molding portion 26b and on the deep side relative to the third narrow molding portion 26c, that is, the third narrow molding portion 26c, the third space molding portion 27c, and the wires 24 connected to the third space molding portion 27c. Each of the first bladder bag part body 112a, the second bladder bag part body 112b, and the third bladder bag part body 112c includes only one space molding portion.

The first connection portion 114a and the second connection portion 114b have properties that they are not disconnected even when the air is introduced into the bladder bag main body 22 and they are resistant to heat to be applied thereto in molding the composite material 10. The first connection portion 114a and the second connection portion 114b are, for example, connection portions made of metal or connection portions made of heat-resistant plastic.

The first connection portion 114a and the second connection portion 114b preferably include pressure valves. The pressure valve provided in the first connection portion 114a can provide pressure difference between the air pressure in the first bladder bag part body 112a and the air pressure in the second bladder bag part body 112b. The pressure valve provided in the second connection portion 114b can provide pressure difference between the air pressure in the second bladder bag part body 112b and the air pressure in the third bladder bag part body 112c. That is to say, in this case, the bladder bag 110 enables the air pressures in the first bladder bag part body 112a, the second bladder bag part body 112b, and the third bladder bag part body 112c to be set to be different values. These pressure valves are provided with through-holes through which the wires 24 exactly pass, the number of the through-holes corresponding to the number of wires 24.

The bladder bag 110 has the above-mentioned configuration, and can therefore be arranged inside the composite material 10 easily because the bladder bag part bodies of the bladder bag main body 22 can be arranged inside the composite material 10 in the order from the bladder bag part body on the deep side. The bladder bag 110 can be taken out from the inside of the composite material 10 more easily because the bladder bag part bodies of the bladder bag main body 22 can be taken out from the inside of the composite material 10 in the order from the bladder bag part body on the entrance side. In the bladder bag 110, the wires 24 are preferably capable of being identified for each bladder bag part body, and in this case, the bladder bag part bodies of the bladder bag main body 22 can be taken out from the inside of the composite material 10 in the order from the bladder bag part body on the entrance side more easily.

A molding method of the composite material 10 in the ninth embodiment will be described. The molding method of the composite material 10 in the ninth embodiment includes an arranging step (step S12), a molding step (step S14), and a taking step (step S16) in a similar manner to the first embodiment. At step S12, step S14, and step S16 in the molding method of the composite material 10 in the ninth embodiment, the bladder bag 20 in the first embodiment is replaced by the bladder bag 110.

At step S12 in the molding method of the composite material 10 in the ninth embodiment, first, the first bladder bag part body 112a, the second bladder bag part body 112b, and the third bladder bag part body 112c are made into states of being separated from each other. Then, the first bladder bag part body 112a is arranged in the first space portion 14a and the first narrow portion 12a of the composite material 10. The second bladder bag part body 112b is arranged in the second space portion 14b and the second narrow portion 12b of the composite material 10, and then, the first bladder bag part body 112a and the second bladder bag part body 112b are connected by the first connection portion 114a. Thereafter, the third bladder bag part body 112c is arranged in the third space portion 14c and the third narrow portion 12c of the composite material 10, and then, the second bladder bag part body 112b and the third bladder bag part body 112c are connected by the second connection portion 114b.

At step S14 in the molding method of the composite material 10 in the ninth embodiment, when the first connection portion 114a and the second connection portion 114b have the pressure valves, the air pressures in the first bladder bag part body 112a, the second bladder bag part body 112b, and the third bladder bag part body 112c can be set to be different values.

At step S16 in the molding method of the composite material 10 in the ninth embodiment, first, the second bladder bag part body 112b and the third bladder bag part body 112c are separated from each other with the second connection portion 114b, and then, the third bladder bag part body 112c is taken out from the third space portion 14c and the third narrow portion 12c of the composite material 10. After that, the first bladder bag part body 112a and the second bladder bag part body 112b are separated from each other with the first connection portion 114a, and then, the second bladder bag part body 112b is taken out from the second space portion 14b and the second narrow portion 12b of the composite material 10. Then, the first bladder bag part body 112a is taken out from the first space portion 14a and the first narrow portion 12a of the composite material 10.

The molding method of the composite material 10 in the ninth embodiment has the above-mentioned configuration, and therefore enables the bladder bag 110 to be arranged inside the composite material 10 easily because the bladder bag part bodies of the bladder bag main body 22 can be arranged inside the composite material 10 in the order from the bladder bag part body on the deep side. The molding method of the composite material 10 in the ninth embodiment enables the bladder bag 110 to be taken out from the inside of the composite material 10 more easily because the bladder bag part bodies of the bladder bag main body 22 can be taken out from the inside of the composite material 10 in the order from the bladder bag part body on the entrance side. With the molding method of the composite material 10 in the ninth embodiment, the wires 24 are preferably capable of being identified for each bladder bag part body in the bladder bag 110, and in this case, the bladder bag 110 can be taken out from the inside of the composite material 10 in the order from the bladder bag part body of the bladder bag main body 22 on the entrance side more easily.

With the molding method of the composite material 10 in the ninth embodiment, the first connection portion 114a and the second connection portion 114b preferably have the pressure valves. In this case, the molding method of the composite material 10 in the ninth embodiment can provide the pressure difference between the air pressure in the first bladder bag part body 112a and the air pressure in the second bladder bag part body 112b with the pressure valve provided in the first connection portion 114a. The molding method of the composite material 10 in the ninth embodiment can provide the pressure difference between the air pressure in the second bladder bag part body 112b and the air pressure in the third bladder bag part body 112c with the pressure valve provided in the second connection portion 114b. That is to say, in this case, the molding method of the composite material 10 in the ninth embodiment enables the air pressures in the first bladder bag part body 112a, the second bladder bag part body 112b, and the third bladder bag part body 112c to be set to be different values. The molding method of the composite material 10 in the ninth embodiment can therefore improve the flexibility of pressure application conditions related to molding the composite material 10.

It should be noted that the first connection portion 114a and the second connection portion 114b capable of mechanically connecting and separating the bladder bag main body 22 or the bladder bag main body 42 may additionally be provided in each of the bladder bag 40, the bladder bag 50, the bladder bag 60, the bladder bag 70, the bladder bag 80, and the bladder bag 90, and the bladder bag 100 instead of the bladder bag 20. Also in these cases, the bladder bag can be arranged inside the composite material 10 easily and can be taken out from the inside of the composite material 10 more easily in a similar manner to the case of the bladder bag 110 formed by additionally providing the first connection portion 114a and the second connection portion 114b in the bladder bag 20.

When the first connection portion 114a and the second connection portion 114b are additionally provided in the bladder bag 40, the wires 44 are preferably capable of being identified for each bladder bag part body, and in this case, the bladder bag can be taken out from the inside of the composite material 10 in the order from the bladder bag part body of the bladder bag main body 42 on the entrance side more easily in a similar manner to the bladder bag 110. When the first connection portion 114a and the second connection portion 114b are additionally provided in the bladder bag 100, the wirings 104 are preferably capable of being identified for each bladder bag part body, and in this case, the bladder bag can be taken out from the inside of the composite material 10 in the order from the bladder bag part body of the bladder bag main body 42 on the entrance side more easily in a similar manner to the bladder bag 110.

Also when the first connection portion 114a and the second connection portion 114b are additionally provided in each of the bladder bag 40, the bladder bag 50, the bladder bag 60, the bladder bag 70, the bladder bag 80, the bladder bag 90, and the bladder bag 100, the first connection portion 114a and the second connection portion 114b preferably have the pressure valves in a similar manner to the case of the bladder bag 110. Also in this case, the pressure valve provided in the first connection portion 114a can provide pressure difference between the air pressure in the first bladder bag part body 112a and the air pressure in the second bladder bag part body 112b, and the pressure valve provided in the second connection portion 114b can provide pressure difference between the air pressure in the second bladder bag part body 112b and the air pressure in the third bladder bag part body 112c in a similar manner to the case of the bladder bag 110. That is to say, also in this case, the air pressures in the first bladder bag part body 112a, the second bladder bag part body 112b, and the third bladder bag part body 112c can be set to be different values in a similar manner to the bladder bag 110.

When the first connection portion 114a and the second connection portion 114b are additionally provided in the bladder bag 40, through-holes through which the wires 44 exactly pass are provided in these pressure valves, the number of the through-holes corresponding to the number of wires 44, in a similar manner to the bladder bag 110. When the first connection portion 114a and the second connection portion 114b are additionally provided in the bladder bag 100, the through-holes through which the wirings 104 exactly pass are provided in these pressure valves, the number of the through-holes corresponding to the number of the wirings 104, in a similar manner to the bladder bag 110.

The molding method of the composite material 10 that is similar to the molding method of the composite material 10 in the ninth embodiment may be implemented using a bladder bag formed by additionally providing the first connection portion 114a and the second connection portion 114b in each of the bladder bag 40, the bladder bag 50, the bladder bag 60, the bladder bag 70, the bladder bag 80, the bladder bag 90, and the bladder bag 100. Also in these cases, the bladder bag can be arranged inside the composite material 10 easily and the bladder bag can be taken out from the inside of the composite material 10 more easily in a similar manner to the molding method of the composite material 10 using the bladder bag 110 in the ninth embodiment.

When the bladder bag formed by additionally providing the first connection portion 114a and the second connection portion 114b in the bladder bag 40 is used, in the molding method of the composite material 10, the wires 44 are preferably capable of being identified for each bladder bag part body, and in this case, the bladder bag can be taken out from the inside of the composite material 10 in the order from the bladder bag part body of the bladder bag main body 42 on the entrance side more easily in a similar manner to the case of using the bladder bag 110. When the bladder bag formed by additionally providing the first connection portion 114a and the second connection portion 114b in the bladder bag 100 is used, in the molding method of the composite material 10, the wirings 104 are preferably capable of being identified for each bladder bag part body, and in this case, the bladder bag can be taken out from the inside of the composite material 10 in the order from the bladder bag part body of the bladder bag main body 42 on the entrance side more easily in a similar manner to the case of using the bladder bag 110.

When a molding method of the composite material 10 that is similar to the molding method of the composite material 10 in the ninth embodiment is implemented using a bladder bag formed by additionally providing the first connection portion 114a and the second connection portion 114b in each of the bladder bag 40, the bladder bag 50, the bladder bag 60, the bladder bag 70, the bladder bag 80, the bladder bag 90, and the bladder bag 100, the first connection portion 114a and the second connection portion 114b preferably have the pressure valves. In this case, these methods for molding the composite material 10 can provide pressure difference between the air pressure in the first bladder bag part body 112a and the air pressure in the second bladder bag part body 112b with the pressure valve provided in the first connection portion 114a. Furthermore, these methods for molding the composite material 10 can provide pressure difference between the air pressure in the second bladder bag part body 112b and the air pressure in the third bladder bag part body 112c with the pressure valve provided in the second connection portion 114b. That is to say, in this case, these methods for molding the composite material 10 enable the air pressures in the first bladder bag part body 112a, the second bladder bag part body 112b, and the third bladder bag part body 112c to be set to be different values. These methods for molding the composite material 10 can therefore improve the flexibility of the pressure conditions related to molding the composite material 10.

Tenth Embodiment

A bladder bag according to a tenth embodiment is a modification of the bladder bag in the ninth embodiment.

The bladder bag in the tenth embodiment is configured such that in the bladder bag in the ninth embodiment, one or a plurality of bladder bag part bodies in the arrangement order from the deep side of the space inside the composite material 10 among the bladder bag part bodies of the bladder bag in the ninth embodiment remain in the space inside the composite material 10. In description of the tenth embodiment, the same reference numeral groups as those in the ninth embodiment denote similar configurations to those in the ninth embodiment and detail description thereof is omitted.

In the bladder bag in the tenth embodiment, the bladder bag part bodies configured so as to remain in the space inside the composite material 10 remain in the space inside the composite material 10 without being taken out at step S16. The bladder bag part bodies that have remained in the space inside the composite material 10 are made of a material capable of being integrated with the composite material 10. The bladder bag part bodies integrated with the composite material 10 are used for, for example, fuel tanks of airplanes, automobiles, vessels, and the like.

The bladder bag in the tenth embodiment is formed by removing the wires 24, the wires 44, the deaerating circuit 52, the string 62, the magnet 72, the solid members, the sensors, and the wirings 104 connected to the bladder bag part bodies configured so as to be integrated with the composite material 10. Alternatively, the bladder bag in the tenth embodiment is formed such that the wires 24, the wires 44, the deaerating circuit 52, the string 62, the magnet 72, the solid members, the sensors, and the wirings 104 connected to the bladder bag part bodies configured so as to be integrated with the composite material 10 are taken out when the bladder bag part body adjacent to the bladder bag part body that is the closest to the entrance among the bladder bag part bodies configured so as to be integrated with the composite material 10 is taken out.

The bladder bag in the tenth embodiment has the above-mentioned configuration, and when it is extremely difficult to take out the arranged bladder bag main body because the composite material 10 has an extremely narrow space due to design of the composite material 10, the bladder bag part bodies as a part of the bladder bag main body can therefore be preferably reused without taking out the bladder bag part bodies arranged in the extremely narrow space.

A molding method of the composite material 10 in the tenth embodiment will be described. The molding method of the composite material 10 in the tenth embodiment includes an arranging step (step S12), a molding step (step S14), and a taking step (step S16) in a similar manner to the ninth embodiment. At step S12, step S14, and step S16 in the molding method of the composite material 10 in the tenth embodiment, the bladder bag 110 in the ninth embodiment is replaced by the bladder bag in the tenth embodiment.

At step S16 in the molding method of the composite material 10 in the tenth embodiment, all of the bladder bag part bodies except the bladder bag part bodies configured so as to remain in the space inside the composite material 10 are taken out in the order from the bladder bag part body on the side of the entrance of the inside of the composite material 10. When the bladder bag part body that is taken out finally is taken out, the wires 24, the wires 44, the deaerating circuit 52, the string 62, the magnet 72, the solid members, the sensors, and the wirings 104 connected to the bladder bag part bodies configured so as to be integrated with the composite material 10 are taken out together.

The molding method of the composite material 10 in the tenth embodiment has the above-mentioned configuration, and when it is extremely difficult to take out the arranged bladder bag main body because the composite material 10 has an extremely narrow space due to design of the composite material 10, the bladder bag part bodies as a part of the bladder bag main body can therefore be preferably reused without taking out the bladder bag part bodies arranged in the extremely narrow space.

REFERENCE SIGNS LIST

10 COMPOSITE MATERIAL
12a FIRST NARROW PORTION
12b SECOND NARROW PORTION
12c THIRD NARROW PORTION
14a FIRST SPACE PORTION
14b SECOND SPACE PORTION
14c THIRD SPACE PORTION
16 OUTER SHELL PORTION
18a FIRST INNER-SIDE PROJECTING PORTION
18b SECOND INNER-SIDE PROJECTING PORTION
18c THIRD INNER-SIDE PROJECTING PORTION
20, 40, 50, 60, 70, 80, 90, 100, 110 BLADDER BAG
22, 42 BLADDER BAG MAIN BODY
24, 44 WIRE
26a, 46a FIRST NARROW MOLDING PORTION
26b, 46b SECOND NARROW MOLDING PORTION
26c THIRD NARROW MOLDING PORTION
27a, 47a FIRST SPACE MOLDING PORTION
27b, 47b SECOND SPACE MOLDING PORTION
27c THIRD SPACE MOLDING PORTION
28, 48 AIR INTAKE
29a, 29b, 29c, 29d, 29e, 29f, 29g, 29h, 49b, 49c, 49d, 49e CORNER PORTION
30 WIRE HOOKING ROD
32 WIRE HOOKING PORTION
34 ROD PORTION
43 GLASS CLOTH
49a REINFORCING PART
52 DEAERATING CIRCUIT
54 DEAERATING CIRCUIT PORT
62 STRING
72, 74, 76 MAGNET
82a, 92a FIRST SOLID MEMBER
82b, 92b SECOND SOLID MEMBER
84, 94 THIRD SOLID MEMBER
86 PROJECTION
102a, 102b, 102c, 102d, 102e, 102f, 102g, 102h, 102i, 102j, 102k, 102l SENSOR
104 WIRING
112a FIRST BLADDER BAG PART BODY
112b SECOND BLADDER BAG PART BODY
112c THIRD BLADDER BAG PART BODY
114a FIRST CONNECTION PORTION
114b SECOND CONNECTION PORTION
200, 210 STRUCTURE
212a FIRST NARROW PORTION
212b SECOND NARROW PORTION
212c THIRD NARROW PORTION
214a FIRST SPACE PORTION
214b SECOND SPACE PORTION
214c THIRD SPACE PORTION
220 MOLD
230 BLADDER BAG
222a, 222b, 222c, 222d, 222e, 222f, 222g, 222h, 222i MOLD PART BODY
232 BLADDER BAG MAIN BODY
236a FIRST NARROW MOLDING PORTION
236b SECOND NARROW MOLDING PORTION

236c THIRD NARROW MOLDING PORTION
237a FIRST SPACE MOLDING PORTION
237b SECOND SPACE MOLDING PORTION
237c THIRD SPACE MOLDING PORTION
238 AIR INTAKE

The invention claimed is:

1. A bladder bag as a mold for molding inside of a composite material structure, the composite material structure including a narrow portion formed by narrowing a part of the inside and a space portion formed so as to be adjacent to the narrow portion, the bladder bag comprising:
a bladder bag main body that includes a narrow molding portion for molding the narrow portion of the composite material structure, a space molding portion for molding the space portion of the composite material structure, and an air intake for introducing air; and
a cord-like member that is provided inside the bladder bag main body, passes through the narrow molding portion from the air intake, and is connected to an inner surface of the space molding portion.

2. The bladder bag according to claim 1, wherein
the bladder bag main body includes a corner portion in the space molding portion,
a plurality of the cord-like members are provided, and
at least one of the cord-like members is connected to the corner portion of the space molding portion.

3. The bladder bag according to claim 1, wherein
the bladder bag main body includes a reinforcing member that reinforces the space molding portion,
a plurality of the cord-like members are provided, and
at least one of the cord-like members is connected to the reinforcing member of the space molding portion.

4. The bladder bag according to claim 1, further comprising a first magnet that is provided in the space molding portion of the bladder bag main body, wherein
the first magnet makes the bladder bag main body and the composite material structure close to each other by bringing a second magnet having a magnetic pole differing from a magnetic pole of the first magnet close to the first magnet from outside of the composite material structure, and separates the bladder bag main body and the composite material structure from each other by bringing a third magnet having the same magnetic pole as the magnetic pole of the first magnet close to the first magnet from the outside of the composite material structure.

5. The bladder bag according to claim 1, further comprising a solid member that is provided on a side of an outer surface of the space molding portion of the bladder bag main body.

6. The bladder bag according to claim 1, further comprising a sensor that is provided on a side of the inner surface of the space molding portion of the bladder bag main body and measures a physical amount of the inside of the composite material structure.

7. The bladder bag according to claim 6, further comprising a wiring connected to the sensor from the air intake.

8. The bladder bag according to claim 6, wherein the sensor is capable of wireless information communication.

9. The bladder bag according to claim 1, wherein the narrow molding portion is capable of being connected to and separated from the bladder bag main body.

10. The bladder bag according to claim 9, wherein the space molding portion separated by the narrow molding portion is to be integrated with the composite material structure.

11. A bladder bag as a mold for molding inside of a composite material structure, the composite material structure including a narrow portion formed by narrowing a part of the inside and a space portion formed so as to be adjacent to the narrow portion, the bladder bag comprising: a bladder bag main body that includes a narrow molding portion for molding the narrow portion of the composite material structure, a space molding portion for molding the space portion of the composite material structure, and an air intake for introducing air; a deaerating circuit that is provided along at least a part of an outer surface of the bladder bag main body; and a string connecting the bladder bag main body and the deaerating circuit; wherein the deaerating circuit is arranged between the bladder bag main body and the composite material structure when the composite material structure is formed, configured to make the bladder bag main body and the composite material structure close to each other by discharging the air in the deaerating circuit, and configured to separate the bladder bag main body and the composite material structure from each other by introducing the air into the deaerating circuit.

12. The bladder bag according to claim 11, wherein
the bladder bag main body includes a corner portion in the space molding portion, and
the string is connected to the corner portion of the space molding portion.

13. The bladder bag according to claim 11, further comprising a first magnet that is provided in the space molding portion of the bladder bag main body, wherein
The first magnet makes the bladder bag main body and the composite material structure close to each other by bringing a second magnet having a magnetic pole differing from a magnetic pole of the first magnet close to the first magnet from outside of the composite material structure, and separates the bladder bag main body and the composite material structure from each other by bringing a third magnet having the same magnetic pole as the magnetic pole of the first magnet close to the first magnet from the outside of the composite material structure.

14. The bladder bag according to claim 11, further comprising a solid member that is provided on a side of an outer surface of the space molding portion of the bladder bag main body.

15. The bladder bag according to claim 11, further comprising a sensor that is provided on a side of the inner surface of the space molding portion of the bladder bag main body and measures a physical amount of the inside of the composite material structure.

16. The bladder bag according to claim 15, further comprising a wiring connected to the sensor from the air intake.

17. The bladder bag according to claim 15, wherein the sensor is capable of wireless information communication.

18. The bladder bag according to claim 11, wherein the narrow molding portion is capable of being connected to and separated from the bladder bag main body.

19. The bladder bag according to claim 18, wherein the space molding portion separated by the narrow molding portion is to be integrated with the composite material structure.

20. A molding method of a composite material structure, the composite material structure including a narrow portion formed by narrowing a part of inside and a space portion formed so as to be adjacent to the narrow portion, the method comprising:
arranging, at the inside of the composite material structure, a bladder bag as a mold including: a bladder bag main body that has a narrow molding portion for molding the narrow portion of the composite material structure, a space molding portion for molding the space portion of the composite material structure, and an air intake for introducing air; and a cord-like member that is provided inside the bladder bag main body, passes through the narrow molding portion from the air intake, and is connected to an inner surface of the space molding portion;

molding the composite material structure while applying pressure to the inside of the composite material structure by introducing the air from the air intake of the bladder bag main body of the bladder bag arranged at the arranging; and taking out the bladder bag from the inside of the composite material structure by pulling the cord-like member from a direction of the air intake after the molding.

21. The molding method according to claim 20, wherein at the taking, the cord-like member is pulled from the direction of the air intake after the composite material structure and the bladder bag main body are separated from each other by hooking the cord-like member on a hooking rod and pulling the cord-like member in a direction of separating the cord-like member from the composite material structure.

22. The molding method according to claim 20, wherein
the bladder bag further includes a first magnet that is provided in the space molding portion of the bladder bag main body,
at the arranging, the bladder bag main body and the composite material structure are made close to each other by bringing a second magnet having a magnetic pole differing from a magnetic pole of the first magnet close to the first magnet from outside of the composite material structure, and
at the taking, the bladder bag main body and the composite material structure are separated from each other by bringing a third magnet having the same magnetic pole as the magnetic pole of the first magnet close to the first magnet from the outside of the composite material structure.

23. The molding method according to claim 20, wherein
the bladder bag further includes a solid member that is provided on a side of an outer surface of the space molding portion of the bladder bag main body, and
at the taking, the bladder bag main body and the solid member are taken out simultaneously.

24. The molding method according to claim 20, wherein
the narrow molding portion is capable of being connected to and separated from the bladder bag main body, and
at the taking, the bladder bag main body is separated from the narrow molding portion and a part of the bladder bag main body remains in a space inside the composite material structure.

25. A molding method of a composite material structure, the composite material structure including a narrow portion formed by narrowing a part of inside and a space portion formed so as to be adjacent to the narrow portion, the method comprising arranging, at the inside of the composite material structure, a bladder bag as a mold including: a bladder bag main body that has a narrow molding portion for molding the narrow portion of the composite material structure, a space molding portion for molding the space portion of the composite material structure, and an air intake for introducing air; a deaerating circuit that is provided along at least a part of an outer surface of the bladder bag main body; and a string connecting the bladder bag main body and the deaerating circuit; molding the composite material structure while applying pressure to the inside of the composite material structure by introducing the air from the air intake of the bladder bag main body of the bladder bag arranged at the arranging and making the bladder bag main body and the composite material structure close to each other by discharging the air in the deaerating circuit arranged between the bladder bag main body and the composite material structure; and taking out the bladder bag from the inside of the composite material structure while separating the bladder bag main body and the composite material structure from each other by introducing the air into the deaerating circuit after the molding.

26. The molding method according to claim 25, wherein
the bladder bag further includes a first magnet that is provided in the space molding portion of the bladder bag main body,
at the arranging, the bladder bag main body and the composite material structure are made close to each other by bringing a second magnet having a magnetic pole differing from a magnetic pole of the first magnet close to the first magnet from outside of the composite material structure, and
at the taking step, the bladder bag main body and the composite material are separated from each other by bringing another magnet having the same magnetic pole as the magnetic pole of the magnet close to the magnet from the outside of the composite material.

27. The molding method according to claim 25, wherein
the bladder bag further includes a solid member that is provided on a side of an outer surface of the space molding portion of the bladder bag main body, and
at the taking, the bladder bag main body and the solid member are taken out simultaneously.

28. The molding method according to claim 25, wherein
the narrow molding portion is capable of being connected to and separated from the bladder bag main body, and
at the taking, the bladder bag main body is separated from the narrow molding portion and a part of the bladder bag main body remains in a space inside the composite material structure.

\* \* \* \* \*